United States Patent
Kelly et al.

(10) Patent No.: US 12,524,651 B2
(45) Date of Patent: Jan. 13, 2026

(54) COMBINED DEEP LEARNING INFERENCE AND COMPRESSION USING SENSED DATA

(71) Applicant: Optum, Inc., Minnetonka, MN (US)

(72) Inventors: Damian Kelly, Kilcock (IE); Megan O'Brien, Nass (IE); Gregory Buckley, Blackrock (IE); Colleen B. Caveney, Brookline, MA (US)

(73) Assignee: Optum, Inc., Minnetonka, MN (US)

( * ) Notice: Subject to any disclaimer, the term of this patent is extended or adjusted under 35 U.S.C. 154(b) by 819 days.

(21) Appl. No.: 17/658,985

(22) Filed: Apr. 12, 2022

(65) Prior Publication Data
US 2023/0325631 A1  Oct. 12, 2023

(51) Int. Cl.
G06N 3/045 (2023.01)
G06N 3/088 (2023.01)

(52) U.S. Cl.
CPC .............. *G06N 3/045* (2023.01); *G06N 3/088* (2013.01)

(58) Field of Classification Search
CPC ............................... G06N 3/045; G06N 3/088
See application file for complete search history.

(56) References Cited

U.S. PATENT DOCUMENTS

| | | |
|---|---|---|
| 9,380,224 B2 | 6/2016 | Keskin et al. |
| 9,530,080 B2 | 12/2016 | Glazer |
| 9,851,230 B2 | 12/2017 | Gestner et al. |
| 10,187,413 B2 | 1/2019 | Vasseur et al. |
| 10,349,493 B2 | 7/2019 | Gharabegian |
| 10,432,897 B2 | 10/2019 | Carey |
| 10,496,905 B2 | 12/2019 | Solomon et al. |
| 10,924,755 B2 | 2/2021 | Ren et al. |
| 10,956,300 B1 | 3/2021 | Yamane et al. |
| 10,992,752 B2 | 4/2021 | Graefe et al. |

(Continued)

FOREIGN PATENT DOCUMENTS

| | | |
|---|---|---|
| WO | 2013052383 S1 | 4/2013 |
| WO | 2019196934 A1 | 10/2019 |

OTHER PUBLICATIONS

Akl et al., "Unobtrusive Detection of Mild Cognitive Impairment in Older Adults Through Home Monitoring", IEEE Journal of Biomedical and Health Informatics, vol. 21, No. 2, Mar. 2017, pp. 339-348.

(Continued)

*Primary Examiner* — Beau D Spratt
(74) *Attorney, Agent, or Firm* — Shumaker & Sieffert, P.A.

(57) ABSTRACT

An example device is configured to encode first sensed data using a first encoder and to predict a first behavior based on the encoded first sensed data to create a first prediction using a first prediction model. The example device is configured to store the encoded first sensed data in the one or more memory units. The example device is configured to control the communication unit to transmit the encoded first sensed data in a first batch to a computing system. The example device is configured to receive, from the computing system via the communication unit, a second encoder, the second encoder being based at least in part on the encoded first sensed data. The example device is also configured to receive, from the computing system via the communication unit, a second prediction model, the second prediction model being based at least in part on the encoded first sensed data.

18 Claims, 11 Drawing Sheets

(56) References Cited

U.S. PATENT DOCUMENTS

| | | | |
|---|---|---|---|
| 11,334,036 B2 | 5/2022 | Yang et al. | |
| 11,455,532 B2 | 9/2022 | Kelly et al. | |
| 11,675,878 B1* | 6/2023 | Pandya | G01S 17/86 |
| | | | 382/103 |
| 11,789,445 B2* | 10/2023 | Huang | G06N 3/08 |
| | | | 701/2 |
| 2015/0180894 A1 | 6/2015 | Sadovsky et al. | |
| 2015/0302310 A1 | 10/2015 | Wernevi et al. | |
| 2017/0298597 A1 | 10/2017 | Hammond | |
| 2018/0039745 A1 | 2/2018 | Chevalier et al. | |
| 2018/0181111 A1 | 6/2018 | Cussonneau et al. | |
| 2018/0329375 A1 | 11/2018 | Gharabegian | |
| 2019/0026761 A1 | 1/2019 | Jain et al. | |
| 2019/0180398 A1 | 6/2019 | Chen et al. | |
| 2019/0319868 A1 | 10/2019 | Svennebring et al. | |
| 2019/0380662 A1 | 12/2019 | Kwan | |
| 2020/0004583 A1 | 1/2020 | Kelly et al. | |
| 2020/0177470 A1 | 6/2020 | Kuo et al. | |
| 2020/0216080 A1* | 7/2020 | Soltanian | A61B 5/7267 |
| 2020/0371491 A1 | 11/2020 | Wong | |
| 2021/0043058 A1 | 2/2021 | Williams et al. | |
| 2021/0153814 A1 | 5/2021 | Demazumder | |
| 2021/0226872 A1* | 7/2021 | Ujiie | H04W 12/61 |
| 2021/0247483 A1 | 8/2021 | Wang et al. | |
| 2021/0281491 A1 | 9/2021 | Yelahanka Raghuprasad et al. | |
| 2021/0295147 A1 | 9/2021 | Kelly et al. | |
| 2021/0297453 A1 | 9/2021 | Crabtree et al. | |
| 2021/0302621 A1 | 9/2021 | Brown | |
| 2021/0326650 A1* | 10/2021 | Jang | G06N 3/045 |
| 2021/0406698 A1 | 12/2021 | O'Brien et al. | |
| 2022/0137611 A1* | 5/2022 | Naito | G05B 23/0221 |
| | | | 706/12 |
| 2022/0159403 A1 | 5/2022 | Sporer et al. | |
| 2022/0246302 A1* | 8/2022 | Fukui | A61B 5/1122 |
| 2023/0290484 A1* | 9/2023 | Ko | G16H 50/70 |
| 2023/0316593 A1* | 10/2023 | Kumar | G06V 10/422 |
| | | | 706/12 |

OTHER PUBLICATIONS

Alcalá et al., "Assessing Human Activity in Elderly People Using Non-Intrusive Load Monitoring", Sensors, vol. 17, No. 2, Feb. 11, 2017, pp. 1-17.

Carboni et al., "Contextualising Water Use in Residential Settings: A Survey of Non-Intrusive Techniques and Approaches", Sensors, vol. 16, May 20, 2016, pp. 1-20.

Fogarty et al., "Sensing From the Basement: A Feasibility Study of Unobtrusive and Low-Cost Home Activity Recognition", UIST '06: Proceedings of the 19th annual ACM symposium on User interface software and technology, Oct. 2006, pp. 91-100.

Guralnik et al., "Event Detection from Time Series Data", Proceedings of the Fifth ACM SIGKDD International Conference on Knowledge Discovery and Data Mining, Aug. 1999, pp. 33-42.

Jebb et al., "Time Series Analysis for Psychological Research: Examining and Forecasting Change", Frontiers in Psychology, vol. 6, Jun. 9, 2015, pp. 1-24.

Kalantarian et al., "Monitoring Eating Habits Using a Piezoelectric Sensor-Based Necklace", Computers in Biology and Medicine, vol. 58, Jan. 9, 2015, pp. 46-55.

Madokoro, Hirokazu, "Piezoelectric Sensors Used for Daily Life Monitoring", Piezoelectricity—Organic and Inorganic Materials and Applications, Aug. 19, 2018, pp. 103-123.

Natta et al., "Soft and Flexible Piezoelectric Smart Patch for Vascular Graft Monitoring Based on Aluminum Nitride Thin Flm", Scientific Reports, vol. 9, No. 8392, Jun. 10, 2019, pp. 1-10.

Nguyen et al., "Water End-Use Classification with Contemporaneous Water-Energy Data and Deep Learning Network", International Journal of Information, Control and Computer Sciences, Nov. 5, 2017, pp. 1-6.

Phyn et al., "Water Leak Detection & Fixture Level Monitoring Technology by Phyn", 5 pp., Retrieved from the Internet on Dec. 22, 2022 from URL: https://www.phyn.com/technology/?gclid=CjwKCAiA8ejuBRAaEiwAAn-J3gbkB_9_oUBsMeU2RG4Ybn%20KYez7FcD91HZxgUipdZk6_%20DvRDVKVXOROCCLSQAvD_BWE%20%3E.

Ueno, "A Piezoelectric Sensor Signal Analysis Method for Identifying Persons Groups", Sensors, vol. 19, No. 733, Feb. 2019, p. 12.

"AI-powered cameras make thermal imaging more accessible," Engadget, accessed from https://www.engadget.com/2016/04//18/flir-ad-movidius-ai-thermal-camera-module/ on Mar. 6, 2020, 14 pp.

Baradel et al., "Glimpse Clouds: Humans Activity Recognition from Unstructured Feature Points," Proceedings of the IEEE Conference on Computer Vision and Pattern Recognition (CVPR), Aug. 2018, 10 pp.

Cho et al., "Deep Thermal Imaging: Proximate Material Type Recognition in the Wild through Deep Learning of Spatial Surface Temperature Patterns," Proceedings of the 2018 CHI Conference on Human Factors in Computing Systems, Cornell University, Mar. 6, 2018.

Courbariaux et al., "Binarized Neural Networks: Training Neural Networks with Weights and Activations Constrained to +1 or −1", arXiv:1602.02830v3, Feb. 9, 2016, 11 pp.

Jiang et al., "Abnormal Event Detection From Surveillance Video by Dynamic Hierarchical Clustering," ICIP 2007, retrieved on Dec. 3, 2008, 4 pp.

Karantzoulidis, "How Advancements in Thermal Camera Tech Are Heating Up Opportunities—Security Sales and Integration," retrieved from https://www.securitysales.com/surveillance/advacements-thermal-camera-tech-opportunities/, Apr. 9, 2018, 11 pp.

Luo et al., "Computer Vision-Based Descriptive Analytics of Seniors' Daily Activities for Long-Term Health Monitoring," Machine Learning for Healthcare, Proceedings of Machine Learning Research 85:1, Year: 2018.

Nasif et al., "The Deep Learning Solutions on Lossless Compression Methods for Alleviating Data Load on IoT Nodes in Smart Cities", Sensors, vol. 21, MDPI, Jun. 20, 2021, 27 pp.

Nogas et al., "DeepFall—Non-invasive Fall Detection with Deep Spatio-Temporal Convolutional Autoencoders,", Year: 2018.

TensorFlow, "For Mobile & Edge", 6 pp., Retrieved from the Internet on Aug. 11, 2022 from URL: https://www.tensorflow.org/lite.

\* cited by examiner

COMBINED DEEP LEARNING INFERENCE AND COMPRESSION USING SENSED DATA

BACKGROUND

To support a private and safe living environment for people vulnerable to health or security risks or other environment, a variety of technologies enable services such as healthcare and security services to monitor behavior. Existing technologies include sensors, including wearable sensors (e.g., alarm necklaces, watches, belt-clips, etc.), RGB video cameras, non-RGB video cameras, and other sensors. The technologies relay information about the user to a service provider, who determines the health or safety of the user's situation.

SUMMARY

The present disclosure describes devices, systems, and techniques that enable monitoring a user's behavior in an environment while maintaining aspects of the user's privacy and protecting data from being intercepted and read. A user may also be referred to herein as an occupant. According to aspects of this disclosure, an edge device collects sensed data from a user's environment, encodes the sensed data, and transmits the encoded sensed data to a computing system. As used herein, an edge device is a device on the edge of a network. The computing system receives the encoded sensed data and trains an updated or new encoder and/or prediction model based on the received encoded sensed data. The edge device also predicts a behavior of the user as either normal or abnormal. In the case of a predicted abnormal behavior, the edge device transmits the prediction to the computing system. The computing system receives the prediction and generates a response.

In some instances, techniques may be used for distinguishing types of behavior of a user in an environment, including distinguishing routine behavior from abnormal behavior. In some cases, the user may be an elderly person and the environment may be the user's home, where the computing system recognizes common activities such as cooking, sleeping, or watching TV as normal behavior, but does not recognize uncommon actions, like tripping or falling as normal behavior. Furthermore, routine behavior at one point in time (e.g., during the day) may be abnormal behavior at another point in time (e.g., during the night), such as an elderly person walking around a garage at 3:00 AM. In other cases, the user may be a community of apartment residents, and the environment may be a shared garage, where the computing system recognizes common activities such as parking a car, walking to a car, or unloading a car as normal behavior, but does not recognize uncommon actions, like walking from car to car or standing still for an hour as normal behavior. In another example, the users may be factory workers.

In such instances, edge devices including sensors may be installed in the desired environment to collect records of activity. In this way, the environment may be monitored while maintaining aspects of the user's privacy by encoding the sensed data prior to transmission of the sensed data to computing system. In some examples, the sensors may include door sensors, flow sensors, vibration sensors, audio sensors, video sensors (thermal, depth, RGB, etc.), or other sensors. Such sensors may be deployed throughout the environment and be attached to fixtures within the environment thereby avoiding requiring the user to wear a monitoring device, such as a necklace, watch, or belt-clip, which may be difficult to remember to wear or may cause discomfort.

According to this disclosure, sensed data may be encoded via an autoencoder on an edge device, thus compressing the data and reducing power requirements for computation. The encoded sensed data may be clustered via a supervised or unsupervised machine learning algorithm (e.g., a prediction model) based on similarities and differences between the encoded sensed data. Such encoded sensed data may be transmitted by the edge device(s) to a computing system, such as one or more edge appliances, hubs, cloud-based servers, or the like. The computing system may use the encoded sensed data to train the autoencoder and/or a prediction model and redeploy an updated or new autoencoder and/or prediction model to the sensing devices, which the sensing devices may use until receiving another updated or new autoencoder and/or prediction model. In some examples, only the encoder portion of the autoencoder may be deployed or redeployed to the edge device(s).

Prior systems may send raw data from a low power edge device to a computing system, but this has disadvantages. For example, the raw data may be more easily intercepted and read by an unintended recipient than encoded data. Raw data also may be relatively inefficient to transmit and store. For example, transmitting constant streams of large data may be power intensive, and due to the memory-constraints of such edge devices, the edge devices may need to frequently send such data.

According to the techniques of this disclosure, an edge device may only transmit encoded representations of the raw data to a centralized model-updating server or device. In this manner, privacy, storage-efficiency, and battery-efficiency may be improved, for example, when the edge device is performing deep learning inference which involves encoders, such as encoders of autoencoders.

Further, by enabling encoders and prediction models to be periodically retrained and redeployed to the edge devices, the encoder for a given individual may be configured to optimally encode the data that is collected for that individual. Such an encoder may be more efficient, more accurate, and even more challenging for a bad actor to decode, without the having the corresponding trained decoder.

In one aspect, this disclosure describes a device comprising: one or more memory units, a communication unit configured to transmit data to and receive data from a computing system; and one or more processors in communication with the memory units and the communication unit, wherein the one or more processors are configured to: encode first sensed data using a first encoder to create encoded first sensed data; predict a first behavior based on the encoded first sensed data to create a first prediction using a first prediction model; store the encoded first sensed data in the one or more memory units; control the communication unit to transmit the encoded first sensed data in a first batch to a computing system; receive, from the computing system via the communication unit, a second encoder, the second encoder being based at least in part on the encoded first sensed data; and receive, from the computing system via the communication unit, a second prediction model, the second prediction model being based at least in part on the encoded first sensed data.

In another aspect, this disclosure describes a computing system comprising: one or more memory units; a communication unit configured to transmit data to and receive data from a device having a first prediction model; and one or more processors in communication with the memory units and the communication unit, wherein the one or more processors are configured to: receive, from the device via the communication unit, encoded first sensed data; decode the encoded first sensed data using a first decoder to create first sensed data; train the first decoder using the first sensed data to create a second decoder; train a first encoder using the first sensed data to create a second encoder; encode the first sensed data using the second encoder to create re-encoded first sensed data; use the re-encoded first sensed data to create a second prediction model, the second prediction model being configured to determine a prediction representative of whether behavior of a user is abnormal or of a particular category of interest; control the communication unit to transmit the second encoder to the device; and control the communication unit to transmit at least a portion of the second prediction model to the device.

In another aspect, this disclosure describes a method comprising: encoding, by one or more processors, first sensed data using a first encoder to create encoded first sensed data; predicting, by the one or more processors, a first behavior based on the encoded first sensed data to create a first prediction using a first prediction model; storing, by the one or more processors, the encoded first sensed data in one or more memory units; controlling, by the one or more processors, communication unit to transmit the encoded first sensed data in a first batch to a device; receiving, by the one or more processors and from a computing system via the communication unit, a second encoder, the second encoder being based at least in part on the encoded first sensed data; and receiving, by the one or more processors and from the computing system via the communication unit, a second prediction model, the second prediction model being based at least in part on the encoded first sensed data.

In another aspect, this disclosure describes a method comprising: receiving, by one or more processors and from a device via a communication unit, encoded first sensed data, the device having a first prediction model; decoding, by the one or more processors, the encoded first sensed data using a first decoder to create first sensed data; training, by the one or more processors, the first decoder using the first sensed data to create a second decoder; training, by the one or more processors, a first encoder using the first sensed data to create a second encoder; encoding, by the one or more processors, the first sensed data using the second encoder to create re-encoded first sensed data; using, by the one or more processors, the re-encoded first sensed data to create a second prediction model, the second prediction model being configured to determine a prediction representative of whether behavior of a user is abnormal or of a particular category of interest; controlling, by the one or more processors, the communication unit to transmit the second encoder to the device; and controlling, by the one or more processors, the communication unit to transmit at least a portion of the second prediction model to the device.

DETAILED DESCRIPTION

Figure 1:
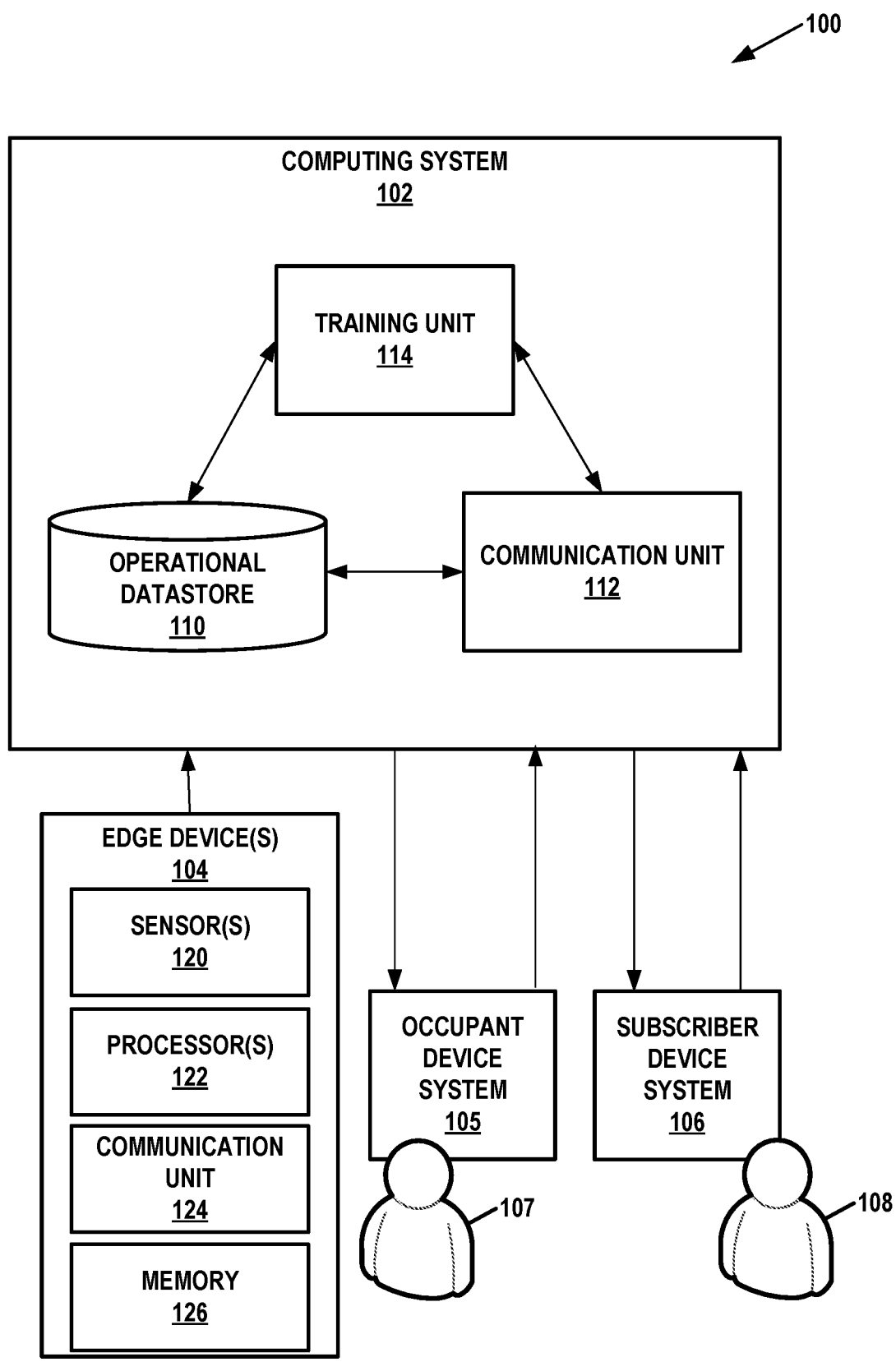
FIG. 1 is a block diagram illustrating an example system in accordance with one or more aspects of this disclosure.

FIG. 1 is a block diagram illustrating an example system 100 in accordance with one or more aspects of this disclosure. In the example of FIG. 1, system 100 includes computing system 102, edge device(s) 104, occupant device system 105, and subscriber device system 106. In other examples, system 100 may include more, fewer, or different components. In some examples, system 100 may include additional subscriber device systems and/or one or more additional computing systems.

Computing system 102 may include one or more computing devices. In examples where computing system 102 includes two or more computing devices, the computing devices of computing system 102 may act together as a system. Example types of computing devices include edge appliances, hubs, cloud-based servers, other server devices, personal computers, handheld computers, intermediate network devices, data storage devices, and so on. In examples where computing system 102 includes two or more computing devices, the computing devices of computing system 102 may be geographically distributed or concentrated together (e.g., on the premises of the environment or in a single data center).

In some examples, edge device(s) 104 include two or more edge devices and the edge devices may be geographically distributed (e.g., amidst rooms of a house, levels of a parking ramp, stations of a warehouse, etc.) or may be concentrated together (e.g., in a single area from different angles, on different doors, on different appliances, or the like). Each of edge device(s) 104 may be a low-power edge device. Each of edge device(s) 104 may include one or more sensor(s) 120, such as audio sensors, vibration sensors, video sensors (thermal, depth, RGB, etc.), door sensors, or other sensors. Each of edge device(s) 104 may include one of more processor(s) 122. Processor(s) 122 may include a low power compute module, such as a microcontroller, low-power fixed programmable gate array (FPGA), an application specific integrated circuit (ASIC), or a microprocessor. Each of edge device(s) 104 may include a communication unit 124 which may be configured to communicate with computing system 102, such as a communication unit configured to communicate via Wi-Fi, BLUETOOTH™, Zigbee, LoRa, 5G/4G/3G/GSM, Universal Serial Bus (USB) or the like. Each of edge device(s) 104 may include memory 126. Memory 126 may include one or more memory units that may store an encoder, a prediction model, and computer-readable instructions for operating the edge device.

While not depicted in FIG. 1, each of edge device(s) 104 may include a system bus, a network connection, an interprocess communication data structure, or any other method for communicating data between sensor(s) 120, processor(s) 122, communication unit 124, and/or memory 126. Each of edge device(s) 104 may also include a power source that may provide electrical energy to the components of each of edge device(s) 104.

Similarly, occupant device system 105 and subscriber device system 106 each may comprise one or more computing devices. In examples where occupant device system 105 or subscriber device system 106 includes two or more computing devices, the computing devices of occupant device system 105 or subscriber device system 106 may act together as a system. Examples of computing devices include smart speakers, mobile phones (e.g., smartphones), smart watches, personal computers, handheld computers, and so on. In examples where occupant device system 105 includes two or more computing devices, the computing devices of occupant device system 105 may be geographically distributed (e.g., local and/or remote from occupant 108) or concentrated together. In examples where subscriber device system 106 includes two or more computing devices, the computing devices of subscriber device system 106 may be geographically distributed (e.g., local and/or remote from subscriber 108) or concentrated together. While system 100 is shown as including occupant device system 105 and subscriber device system 106, in some examples, system 100 may not include one of or either of occupant device system 105 or subscriber device system 106. Occupant device system 105 may be a device system used by occupant 107 of an environment. Occupant 107 may be the subject of monitoring techniques of this disclosure. Subscriber device system 106 may be a device system used by subscriber 108. Subscriber 108 may be a family member, friend, caregiver, healthcare provider, or other person or organization concerned about the well-being of occupant 107.

Computing system 102, edge device(s) 104, occupant device system 105, and subscriber device system 106 may communicate via one or more communication techniques. In some examples, the communication techniques may include Wi-Fi, BLUETOOTH™, Zigbee, LoRa, 5G/4G/3G/GSM, the Internet. Ethernet, or the like.

Computing system 102 may be operated by or on behalf of a community or an organization interested in monitoring an environment where activity is patterned and/or predictable and where a new activity may signify a need for help promptly. Simultaneously, the organization may be interested in maintaining aspects of the privacy of the occupants of the environment. As one example, a healthcare provider may be interested in monitoring the activity of patients where health risks are prevalent, but the constant presence of a personal care assistant is not currently necessary or desired (e.g., in a private residence, in a nursing home, in a hospital room, etc.). For instance, the healthcare provider may be interested in identifying immediately when an elderly person falls down the stairs so that emergency responders may be dispatched to the person's aid as soon as possible. As another example, a security provider may be interested in monitoring the activity of clients where safety risks are present, but a personal bodyguard is not necessary or desired (e.g., a private property, a gym locker room, a parking ramp, etc.). For instance, the security provider may be interested in identifying immediately when a person is trying to open doors on every vehicle in a parking ramp so that security personnel may intervene promptly before a car theft is perpetrated.

In other monitoring systems, edge devices, such as sensing devices, may transmit unencoded sensed data continuously to a central computing system. In contrast, edge device(s) 104 may transmit encoded data in batches to computing system 102, thereby making it more difficult for an unintended recipient or bad actor to intercept and read the transmitted data. In still other monitoring systems, monitoring requires processing high amounts of data, which entails large computational power and energy costs. In contrast, edge device(s) 104 reduce the sensed data into codes (e.g., encoded sensed data), which may enable a relatively high rate of processing with lower computational power. In still other monitoring systems, monitoring is attempted by comparing data from one environment with data from another environment, which risks poor-quality recognition of irregular events. In contrast, edge device(s) 104 detect irregular data by comparing data within the same environment, which may enable higher accuracy in detection of noteworthy events.

Edge device(s) 104 may monitor an environment to detect irregularities in routine behavior of occupants of the environment. For example, edge device(s) 104 sense data in the environment. Edge devices(s) 104 may utilize machine learned encoders, such as encoders of autoencoders, which may be trained by computing system 102 and deployed to edge device(s) 104, to encode the sensed data before transmitting the sensed data to computing system 102. Edge device(s) 104 may also utilize a machine learned prediction model which may be trained by computing system 102 and deployed to edge device(s) 104, to predict whether a behavior of subscriber 108 is normal or abnormal. Edge device(s) may transmit abnormal predictions to computing system 102 for taking an action in response to receiving the abnormal predictions.

When an organization receives a request to monitor an environment, the organization may set up edge device(s) 104 in the environment. In some examples, the organization may also set up computing system 102 in the environment. In other examples, the organization may maintain computing system 102 in its own environment or in the cloud. The environment may be associated with a specific occupant who frequents the environment. In some cases, occupant 107 may be an individual. For example, occupant 107 may be an individual with a physical disability, and the environment is the individual's home. In other cases, occupant 107 may be two or more individuals. For example, occupant 107 may be an elderly couple living at home together, and the environment is the home. In another example, occupant 107 may be a community in an apartment complex, and the environment is a common facility. Setting up edge device(s) 104 in the environment may require the permission of occupant 107.

The organization may monitor the environment for uncommon events. For example, occupant 107 in an environment may engage in repetitive activities, such as walking, cooking, reading a book, watching TV, and so on. In some cases, occupant 107 may continue those repetitive activities for a long time (e.g., for weeks, months, or years). The repetitive activities may be known as activities of daily living (ADL) and considered routine behavior. In other cases, occupant 107 may interrupt the routine behavior with a noteworthy event, such as falling and lying still on the floor for a long period of time, or abnormal behavior potentially representative of cognitive decline, such as wandering in and out of a room several times. The organization may assess a deviation from normal behavior and quickly (e.g., over a period of seconds or minutes) determine that the deviation is indicative of, for example, a noteworthy event.

Alternatively, the organization may assess deviations from normal behavior over a long time period (e.g., several months) before determining that the deviations are indicative of, for example, abnormal behavior corresponding to cognitive decline. In monitoring occupant 107, the organization may be able to intervene proactively in response to the noteworthy event or abnormal behavior instead of waiting a longer time for occupant 107 or someone witnessing the subscriber to report the new activity.

Computing system 102 may receive the encoded sensed data and store the encoded sensed data in operational datastore 110. In some examples, computing system 102 may match the encoded sensed data to an account unique to occupant 107. Training unit 114 of computing system 102 may train an encoder with encoded first sensed data from an edge device of edge device(s) 104, where the encoder learns distinguishing characteristics of the encoded first sensed data. Computing system 102 may deploy the encoder to the edge device. The codes output by the encoder may compress or reduce the data, which may enable compact transmission, storage, and efficient processing. Thus, a code may be a compressed representation of raw sensor data generated by the encoder which may be decoded by a corresponding decoder to generally or actually recreate the raw sensor data. In some examples, the encoder may be unique to occupant 107, such that the codes distinctively represent data from occupant 107. In some examples, the encoder may be unique to a given edge device of edge device(s) 104. In some examples, an initially deployed encoder may be based on encoded sensed data of other subscribers or other edge devices.

When clustered, the codes generated by the encoder may form clusters corresponding to features, activities, and/or events in the environment of occupant 107, such as movements of a human being, a heating oven, or an empty room. A cluster may be a grouping of codes whose characteristics or features are similar. The features may be further related to a specific location and/or time in the environment. Training unit 114 trains a prediction model with a machine-learning algorithm to assign each code of the first encoded sensed data to a cluster. In some examples, the machine-learning algorithm may be unsupervised, so the codes may be categorized effectively without labels. In other examples, the machine-learning algorithm may be supervised, so the codes may be categorized with labels, such as a fall of occupant 107. In further examples, a supervised machine-learning algorithm may be trained to reproduce the labels which correspond to the cluster labels produced by the unsupervised machine learning algorithm. In some examples, the identified clusters represent routine behaviors or expected features of the environment of occupant 107. For example, the routine behaviors may represent activities of daily living (ADL). In other cases, the routine behaviors may represent safe and/or regular activities in a facility. The prediction model may be stored in operational datastore 110 and be deployed to an edge device of edge device(s) 104. In some examples, the prediction model may be unique to occupant 107. In some examples, the prediction model may be unique to a given edge device 104A. In some examples, an initially deployed prediction model may be based on encoded sensed data of other subscribers or other edge devices.

Computing system 102 may receive a prediction from one of edge device(s) 104. The prediction may be a prediction of an abnormal behavior that may have a high probability of being an actionable event, where the organization would take action to respond to the event. In some examples, computing system 102 may generate an alert or alarm for output in response to receiving the prediction. For example, computing system 102 may make an automated phone call, send a text message, send an email, or the like to occupant 107, subscriber 108, an emergency service, a caregiver, emergency contact, a building owner, a service provider, or the like, that may be associated with occupant 107.

In some examples, computing system 102 may attempt to confirm that the outlier is an actionable event, warranting a response from the organization, by performing a different alert action prior to alerting the emergency service, caregiver, emergency contact, building owner, service provider, or the like. Such an alert action may include sending a notification to occupant device system 105 and/or subscriber device system 106.

For example, in response to receiving the prediction, communication unit 112 may send a notification to occupant device system 105 and/or subscriber device system 106. Subscriber device system 106 may include one or more devices belonging to subscriber 108 and/or users associated with occupant 107, such as friends or family of occupant 107. In some cases, occupant 107 may respond to the notification from communication unit 112. In other cases, subscriber 108 or another user associated with occupant 107 may respond.

The notification may be customized for each device of occupant device system 105 or subscriber device system 106. For example, the device may be or may include an audio device, in which case the notification may include an audio notification. Additionally, or alternatively, the device may have a display, in which case the notification may include a visual notification.

In some cases, the device of occupant device system 105 and/or subscriber device system 106 has installed a special-purpose application to receive notifications from communication unit 112. In such cases, communication unit 112 may send the notification to an application programming interface (API) of the special-purpose application. The special-purpose application may, in response to receiving the notification, cause the device to output a message regarding the notification. For example, the special-purpose application may cause the device to output a banner message for display, to read the message aloud, to generate a notification sound, to provide haptic vibration, and/or otherwise to notify occupant 107 or subscriber 108 of the arrival of the notification. For example, a special-purpose application of occupant device system 105 may output a user interface for display that includes features allowing occupant 107 to provide user input that indicates whether occupant 107 has experienced an actionable event. Accordingly, the special-purpose application may cause the device to generate and send a response notification indicating the user input. For instance, the special-purpose application may cause occupant device system 105 to send the occupant response to an API of communication unit 112.

Communication unit 112 may be configured to receive a response from occupant device system 105 in a variety of forms. For example, if the responding device from occupant device system 105 is an audio device, communication unit 112 may receive an oral response (e.g., occupant 107 may say, "Yes, I need help."). Additionally, or alternatively, if the responding device from occupant device system 105 is a device with a display, communication unit 112 may receive a written response (e.g., occupant 107 may type, "No help needed," or may click a "No" button in the special-purpose application). Communication unit 112 may include a natural language processing module to interpret the response.

Computing system 102 may react to the response from occupant device system 105 by alerting the emergency service, caregiver, emergency contact, building owner, service provider, or the like and/or by updating data in operational datastore 110. For example, if computing system 102 does not receive a response from occupant device system 105, communication unit 112 may alert subscriber 108 via subscriber device system 106, an emergency service, caregiver, emergency contact, building owner, service provider, or the like of the actionable event. In another example, if computing system 102 receives a response from occupant device system 105 confirming that an actionable event has occurred, communication unit 112 alerts subscriber 108 via subscriber device system 106, the emergency service, caregiver, emergency contact, building owner, service provider, or the like of the event. In yet another example, if computing system 102 receives a response from occupant device system 105 denying that an actionable event has occurred, communication unit 112 may send a notification to occupant device system 105 requesting an identification of the event. Occupant 107 may provide an identification, and training unit 114 may label the outlier code leading to the prediction with the identification and store the outlier-identification pair in operational datastore 110.

Periodically, even in the absence of receiving a prediction, communication unit 112 may send a notification to occupant device system 105 requesting an identification of a feature, an activity, and/or an event in environment of occupant 107. The feature, activity, and/or event may correspond with a cluster. For example, communication unit 112 may send a notification via a smart speaker belonging to occupant 107, asking, "What are you usually doing at 9:00 AM in your kitchen?" As another example, communication unit 112 may send a notification as a text message to a mobile device belonging to occupant 107, asking, "What is the hot item in the corner of your living room?" Communication unit 112 may receive a response (e.g., an oral message or a written message) from occupant device system 105 identifying the feature, activity, and/or event. For example, occupant 107 may instruct a smart speaker to send a message to communication unit 112 saying, "Usually I am using the toaster at 9 AM." As another example, occupant 107 may send a message via the special-purpose application, writing, "The hot item in the living room is a fireplace." In this way, training unit 114 may label the codes of the cluster with the identification from occupant 107 and store the code-identification pairs in operational datastore 110.

Periodically, training unit 114 may retrain the encoder and/or the prediction model with new encoded data received from an edge device of edge device(s) 104. The encoder may determine new codes to represent the encoded sensed data, and the prediction model may determine new patterns in the codes. For example, new patterns may become apparent based on the identification information provided by occupant 107. In some cases, the labels correspond exactly with clusters determined by the first prediction model. In other cases, a label may describe two or more clusters. In such cases, training unit 114 may modify the prediction model to combine the two or more clusters into one cluster. That is, training unit 114 may determine a first cluster of codes labelled with a name and a second cluster of codes labelled with a similar name, and may combine the first cluster and the second cluster into one cluster corresponding to the name. In still other cases, two or more labels may describe codes within one cluster. In such cases, training unit 114 may modify the prediction model to separate the cluster into two or more clusters corresponding to the two or more labels. That is, training unit 114 may determine codes in the cluster labelled with a first name and other codes in the cluster labelled with a second name, and may separate the codes labelled with the first name from the codes labelled with the second name by splitting the cluster into two clusters corresponding to the first and second names. In this way, training unit 114 becomes more refined over time.

Training unit 114 may build a prediction model from the clusters based on labels provided by occupant 107. Each cluster may correspond to a respective label referring to a feature, an activity, and/or an event in the environment. The prediction model may further include outliers and corresponding labels. Thus, training unit 114 may create a system of classes identifying routine and actionable behaviors. As a result, when the encoder maps one or more thermal images to a new code, the new code may be categorized into a class and identified as the feature, activity, and/or event corresponding to the class.

Each of edge device(s) 104 may, via such a prediction model, monitor the environment for a particular actionable event. For example, edge device(s) 104 may be configured to monitor for occupant 107 falling down the stairs. The prediction model may have a class corresponding to the outlier event of falling such that a new code representing a fall is classified as falling. In this way, edge device(s) 104 may determine that the new code represents falling without reaching out to occupant 107. Once communication unit 112 receives a prediction of falling, communication unit 112 may send a notification to occupant device system 105 and to the emergency service, caregiver, emergency contact, building owner, service provider, or the like, providing details of the fall as soon as the fall occurs, with minimal delay.

Additionally, or alternatively, edge device(s) 104, via such a prediction model, may provide records of routine behaviors over time to computing system 102. For example, if occupant 107 is an adult in independent living, the prediction model may show, without input from occupant 107, what ADL occupant 107 partakes in. In some cases, identifying ADL may provide a measurement for the ability of occupant 107 to live independently. In other cases, identifying irregularities in ADL (e.g., using a bathroom several times in quick succession, missing mealtimes, not moving for long periods of time, etc.) may indicate cognitive decline. In such cases the computing system 102 may inform a family member, clinician, such as a family physician, or other stakeholder in the individual's health about such progressions. In still other cases, understanding the ADL of occupant 107 may allow computing system 102 to supplement the abilities of occupant 107 with additional help, such as a reminder to take a medication when in the kitchen.

In accordance with the techniques of this disclosure, edge device(s) 104 may encode first sensed data using a first encoder to create encoded first sensed data. Edge device(s) 104 may predict a first behavior based on the encoded first sensed data to create a first prediction using a first prediction model. Edge device(s) 104 may store the encoded first sensed data in the one or more memory units. Edge device(s) 104 may control the communication unit to transmit the encoded first sensed data in a first batch to a computing system. Edge device(s) 104 may receive, from computing system 102 via the communication unit, a second encoder, the second encoder being based at least in part on the encoded first sensed data. Edge device(s) 104 may receive, from computing system 102 via the communication unit, a second prediction model, the second prediction model being based at least in part on the encoded first sensed data.

In accordance with the techniques of this disclosure, computing system 102 may receive from an edge device of edge device(s) 104 via communication unit 112 encoded first sensed data. Computing system 102 may decode the encoded first sensed data using a first decoder to create first sensed data. Computing system 102 may train the first decoder using the first sensed data to create a second decoder. Computing system 102 may train a first encoder using the first sensed data to create a second encoder. Computing system 102 may encode the first sensed data using the second encoder to create re-encoded first sensed data. Computing system 102 may train a first prediction model using the re-encoded first sensed data to create a second prediction model. The first prediction model and the second prediction model may be configured to determine a prediction representative of whether behavior of a user (e.g., occupant 107) is abnormal. Computing system 102 may control communication unit 112 to transmit the second encoder to the edge device. Computing system 102 may control the communication unit to transmit the second prediction model to the edge device.

Figure 2:
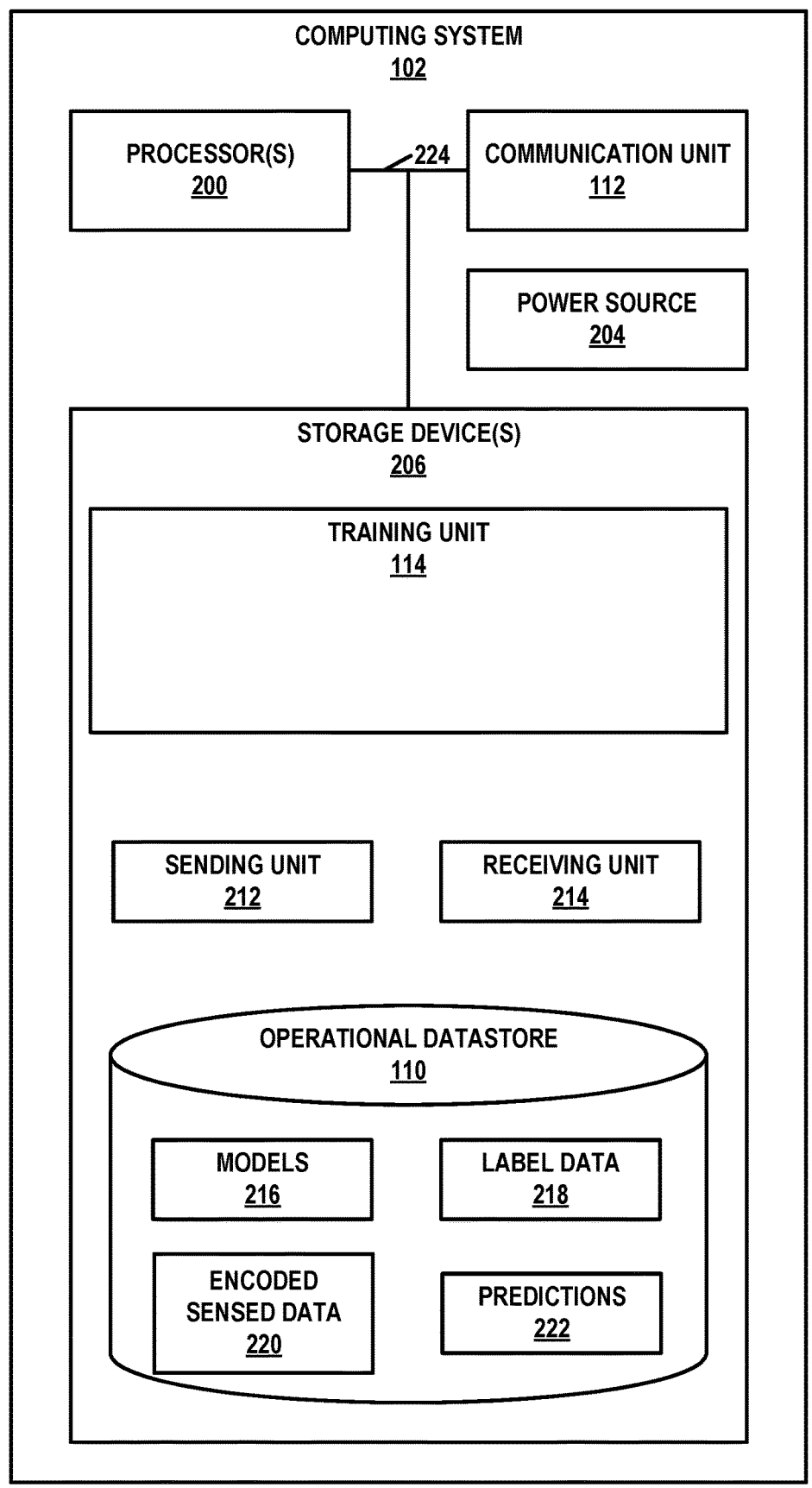
FIG. 2 is a block diagram illustrating example components of a computing system in accordance with one or more aspects of this disclosure.

FIG. 2 is a block diagram illustrating example components of computing system 102 in accordance with one or more aspects of this disclosure. FIG. 2 illustrates only one example of computing system 102, without limitation on many other example configurations of computing system 102.

As shown in the example of FIG. 2, computing system 102 includes one or more processor(s) 200, communication unit 112, a power source 204, one or more storage device(s) 206, and one or more communication channels 224. Computing system 102 may include other components. For example, computing system 102 may include input devices, output devices, display screens, and so on. Communication channel(s) 224 may interconnect each of components 200, 112, and 206 for inter-component communications (physically, communicatively, and/or operatively). In some examples, communication channel(s) 224 may include a system bus, a network connection, an inter-process communication data structure, or any other method for communicating data. Power source 204 may provide electrical energy to components 200, 112, and 206. Storage device(s) 206 may store information required for use during operation of computing system 102.

Processor(s) 200 comprise circuitry configured to perform processing functions. For instance, one or more of processor(s) 200 may be a microprocessor, ASIC, FPGA, or other type of processing circuit. In some examples, processor(s) 200 of computing system 102 read and may execute instructions stored by storage device(s) 206.

Communication unit 112 may enable computing system 102 to send data to and receive data from one or more other computing devices such as edge device(s) 104, occupant device system 105, and subscriber device system 106. For example, communication unit 112 may be configured to receive encoded sensed data and predictions from edge device(s) 104 and to transmit encoders and prediction models to edge device(s) 104. For instance, communication unit 112 may be configured to send notifications to occupants, receive occupant responses, send notifications to subscribers, emergency service, caregiver, emergency contact, building owner, service provider, or the like. In some examples, communication unit 112 may include wireless transmitters and receivers that enable computing system 102 to communicate wirelessly with other computing devices. Examples of communication unit 112 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 102 may use communication unit 112 to communicate with one or more other computing devices or systems, such as edge device(s) 104, occupant device system 105, and subscriber device system 106.

Storage device(s) 206 may store operational datastore 110. In the example of FIG. 2, operational datastore 110 may include models 216, label data 218, encoded sensed data 220, predictions 222 and/or other data. Models 216 may include trained encoder(s), corresponding decoder(s), and/or prediction model(s). Label data 218 may include descriptions provided by occupant 107 or generated by prediction model(s) (e.g., descriptions of routine behaviors or abnormal events) and pairings between the descriptions and one or more codes. Encoded sensed data 220 may include encoded sensed data received from edge device(s) 104. Predictions 222 may include the predictions received by computing system 102 from edge device(s) 104. While computing system 102 is shown as storing predictions 222 in operational datastore 110, in some examples, such predictions are not stored in operational datastore 110.

Processor(s) 200 may read instructions from storage device(s) 206 and may execute instructions stored by storage device(s) 206. Execution of the instructions by processor(s) 200 may configure or cause computing system 102 to provide at least some of the functionality ascribed in this disclosure to computing system 102. As shown in the example of FIG. 2, storage device(s) 206 include computer-readable instructions associated with training unit 114. Additionally, in the example of FIG. 2, storage device(s) 206 may include computer-readable instructions associated with communication unit 112. In some examples, the computer-readable instructions associated with communication unit 112 may include computer-readable instructions associated with sending unit 212 and receiving unit 214.

Training unit 114 trains models 216 based on encoded sensed data 220 and/or label data 218. Initially, training unit 114 may collect data for a period of time (e.g., a few days, one or more weeks, etc.) prior to training models 216. At other times, training unit 114 may train models 216 on a periodic basis, upon receiving new data from an edge device of edge device(s) 104, or upon receiving an external command, such as from an operator of computing system 102.

Models 216 may be one or more machine learning models. In some examples, training unit 114 may train models 216 from one or more machine learning algorithms based on training data such as encoded sensed data, label data 218, and/or other data. For example, training unit 114 may train an encoder on encoded sensed data 220 to generate an updated or new encoder. As another example, training unit 114 may train a prediction model on encoded sensed data 220 to determine related codes based on similar characteristics. In some cases, training unit 114 may create a prediction model by applying label data 218 to the codes.

Once trained and deployed to edge device(s) 104, models 216 may be able to organize encoded sensed data on edge device(s) 104 into behavior patterns of occupant 107. Recognition of behavior patterns may be based on distinguishing characteristics of encoded sensed data (e.g., characteristics that distinguish one encoded sensed data from another encoded sensed data). For example, the prediction model may determine that subsets of the encoded sensed data are more alike than other subsets of the encoded sensed data and categorize the subsets accordingly into clusters. For example, the prediction model may compare characteristics of new encoded data to earlier encoded data and determine whether the characteristics of the new encoded data is within a similarity threshold of the earlier encoded data. Furthermore, a supervised classification model can be trained to predict the appropriate cluster label for future samples, to accelerate the cluster assignment process. The cluster assignment is discussed further hereinafter with respect to FIG. 7. The clusters may correspond respectively to routine behaviors. For example, if the environment of occupant 107 is a home, the clusters may correspond respectively to ADL, such as cooking, watching TV, or sleeping. As another example, if the environment of occupant 107 is a gym locker room, the clusters may correspond respectively to changing clothes, showering, or using a restroom. After communication unit 112 elicits feedback from occupant 107 identifying the routine behaviors by name, the prediction model may distinguish the clusters by classes based on label data 218. As a result, models 216 may recognize new codes as representative of routine behavior or abnormal behavior based on the distinguishing characteristics used to train models 216.

Encoded sensed data 220 is a compression of sensed data sensed by sensor(s) 120 (FIG. 1), containing critical information of the sensed data to enable reconstructing the sensed data. Similar encoded sensed data may have similar codes in encoded sensed data 220. For example, encoded sensed data 220 may be in the form of a vector with a given length (e.g., 4 attributes, 10 attributes, 50 attributes, etc.), where a shorter length reduces the storage and processing requirements for computing system 102 and edge device(s) 104. Such attributes may be compared, for example, by a prediction model of models 216 deployed on one of edge device(s) 104 to earlier sensed data to determine whether new encoded sensed data of encoded sensed data 220 should be part of a cluster or not. In this manner, the prediction model may determine whether the behavior of occupant 107 is normal or abnormal.

Label data 218 may include identifications of codes in encoded sensed data 220. Occupant 107 may provide identifications, stored as label data 218, via written message or audio message, as managed by communication unit 112. In some cases, a label in label data 218 may correspond to a cluster of codes. In other cases, a label in label data 218 may correspond to an outlier from the clusters of codes. While system 100 (FIG. 1) may monitor occupant 107 effectively without label data 218. Label data 218 may provide additional sensitivity (e.g., reduced false positives) and functionality to system 100.

Training unit 114 may train an encoder and a corresponding decoder of models 216. For example, the corresponding decoder may be configured to decode the data encoded by the encoder. In some examples, the encoder may be an encoder of an autoencoder neural network, such as a convolutional autoencoder. The encoder may include or consist of a number of layers of encoding blocks (e.g., one, four, or ten layers) with pooling methods (e.g., max pooling or average pooling), a flatten layer, and a dense layer to reduce resolution and increase effectiveness of the encoder. As a result, the encoder may produce a code from the input sensor data. The corresponding decoder, which may be a decoder of the autoencoder, may include or consist of a number of layers of decoding blocks (e.g., one, four, or ten layers) with upsampling methods, followed by a final decoding block. As a result, the decoder may transform the code into sensed data generally corresponding to the original sensed data. Training unit 114 may supply hyperparameters, such as a code size, a filter size, a stride size, a number of layers of the encoder, and a loss function (e.g., cross entropy, mean squared error, etc.). The encoder may learn distinguishing characteristics of the sensed data and, when deployed to one of edge device(s) 104, use the characteristics to compress the data into codes, outputting encoded sensed data which may be stored in encoded sensed data 220. In some cases, the encoded sensed data may be further dimensionally reduced, such as by parametric t-SNE, PCA, or ICA algorithms. In other cases, the encoded sensed data may not be further dimensionally reduced.

Training unit 114 may apply encoded sensed data 220 as input to a machine learning algorithm, such as a K-means algorithm, to create the prediction model(s) of models 216. The prediction model(s) of models 216 may include a clustering algorithm and a classifying algorithm. Training unit 114 may further provide parameters for the machine learning algorithm (e.g., a number of clusters for the K-means algorithm, etc.). The K-means algorithm may be a clustering algorithm and may identify natural groups or clusters of codes of encoded sensed data 220, where the groups represent patterns in features, activities, and/or events of the environment of occupant 107. In other examples, training unit 114 may apply encoded sensed data 220 to a different machine learning algorithm, such as, for example, K-means++, bisecting K-means, expectation-maximization, self-organizing maps, agglomerative hierarchical (e.g., single-link, complete-link, or group average), shared nearest neighbors, Chameleon, DB SCAN, CLIQUE, CURE, DENCLUE, etc., to create the prediction model.

In some cases, training unit 114 may have access to label data 218 corresponding to codes based on clusters output by the prediction model. For example, occupant 107 may provide identification of codes in a cluster via communication unit 112, with the identification stored as label data 218. As another example, training unit 114 may apply artificial labels to the codes of clusters (e.g., "Group 1," "Group 2," etc.), with the artificial labels stored as label data 218. Training unit 114 may use labelled codes to build a prediction model, e.g., a classification model, such as with a decision tree, nearest neighbor, Naïve Bayes, rule-based, support vector machine (SVM), or neural network algorithm.

Training unit 114 may periodically, or upon prompting, retrain models 216. For example, training unit 114 may initially create models 216 based on encoded sensed data from a plurality of subscribers or from a plurality of edge devices. Training unit 114 may subsequently retrain models 216 when appropriate using encoded sensed data received from edge device(s) 104. In some examples, when further retraining models 216, training unit 114 may use some or all the training data (e.g., encoded sensed data) used to train models 216 previously. In other examples, the second training data set may not include any training data used to train models 216 previously (i.e., all new training data). After training unit 114 has retrained models 216, models 216 may be different than the models 216 trained previously.

In some examples, training unit 114 may retrain models 216 on regular time intervals (e.g., daily, weekly, monthly, bimonthly, biannually, etc.). In other examples, training unit 114 may retrain models 216 on an irregular basis, such as based on new labels added to label data 218, upon receipt of a new batch of encoded sensed data from edge device(s) 104, or upon receipt of an external command to retrain models 216. For instance, if occupant 107 submits identification of a feature, activity, and/or event corresponding to a cluster or an outlier, training unit 114 may retrain models

216 to incorporate the new information. In some cases, training unit 114 may determine, in a cluster, codes labelled with a first name and codes labelled with a second name. In such cases, training unit 114 may separate the codes labelled with the first name from the codes labelled with the second name by splitting the first cluster into two clusters. For example, if occupant 107 identifies one subset of codes as "cooking" and another subset of codes as "washing dishes," and the prediction model (e.g., clustering model) had originally joined the two subsets into a single cluster, then training unit 114 may retrain the encoder to recognize a characteristic differentiating the two activities in encoded sensed data 220 and/or may retrain the prediction model to separate the corresponding codes into different clusters. In other cases, training unit 114 may determine codes labelled with a name in a first cluster and codes labelled with a similar name in a second cluster. In such cases, training unit 114 may train the prediction model to combine the first cluster and the second cluster into one cluster. In other examples, additional or alternative situations may trigger the retraining of models 216 by training unit 114.

In some examples, training unit 114 monitors the sensitivity of models 216. For example, when communication unit 112 sends a notification to occupant device system 105 regarding a detected outlier, occupant device system 105 may confirm or deny that the outlier corresponds to an actionable event. In some cases, occupant device system 105 may confirm that the outlier corresponds to an actionable event, and training unit 114 may interpret the confirmation as a successful processing and classification of the input data. In other cases, occupant device system 105 may deny that the outlier corresponds to an actionable event, and training unit 114 may interpret the denial as a failure to process and classify input data (i.e., a false positive). In such cases, training unit 114 may determine to retrain the autoencoder and/or the prediction model(s).

After communication unit 112 receives a prediction of abnormal behavior of occupant 107, communication unit 112 may perform an alert action. The alert action may include engaging with occupant device system 105, subscriber device system 106 and/or with an emergency service, caregiver, emergency contact, building owner, service provider, or the like. In some cases, performing the alert action may comprise prompting, via occupant device system 105, a response to indicate whether an activity is an actionable event (i.e., the activity requires a responsive action by the organization associated with computing system 102). In other cases, communication unit 112 may prompt occupant 107 to provide an identification of a feature, activity, and/or event represented by a cluster of codes. In other cases, performing the alert action may include temporarily activating another recording device, such an RGB video camera, in the environment of occupant 107 to provide more detailed information about an anomalous behavior. In some examples, communication unit 112 may only perform the alert action for a cluster containing a minimum number of codes.

Communication unit 112 may employ sending unit 212 to generate the alert action. In some cases, the alert action might be a generic message, such as, "We detected abnormal activity. Do you need help?" In such cases, sending unit 212 may use the same message to communicate about any outlier. In other cases, such as when prompting an identification of a feature, activity, and/or event represented by a cluster, sending unit 212 may produce a unique message, such as a message describing unique features of the cluster. For example, sending unit 212 may determine that a location, a time, a temperature, a shape, or another characteristic of the environment represented by the codes in the cluster distinguishes the cluster from other clusters, and may specify one or more distinguishing characteristics in the message.

Sending unit 212 may include a natural language processing unit to facilitate communication. For example, sending unit 212 may generate a message (e.g., a question, a greeting, a polite response, etc.) in an audio format, with the proper vocabulary and grammar used by occupant 107 and/or the community of occupant 107 associated with occupant device system 105. As another example, sending unit 212 may generate a message (e.g., a question, a greeting, a polite response, etc.) in a written format, with appropriate spelling and punctuation.

After generating a message, sending unit 212 may determine a channel by which to send the message to each device in occupant device system 105. For example, if the device is a mobile phone, sending unit 212 may send the written message as a text to the mobile phone. As another example, if the device is a smart speaker, sending unit 212 may send the audio message as a voice recording to the smart speaker.

Sending unit 212 may also deploy or transmit updated or new models 216 to edge device(s) 104. For example, sending unit may send a retrained encoder or a retrained prediction model (e.g., a classifying algorithm) to an edge device of edge device(s) 104.

Receiving unit 214 may receive one or more responses to the alert action generated by sending unit 212. In some cases, the response may come from occupant 107. In other cases, the response may come from a trusted associate or caregiver of occupant 107 with access to occupant device system 105. The responses may be in a variety of formats. For example, a response may be sent by text from a mobile phone in a written format. As another example, a response may be sent by a smart speaker in an audio format. In some cases, sending unit 212 may send a message to a certain device of occupant device system 105, and receiving unit 214 may receive a response from a different device of occupant device system 105. In other cases, sending unit 212 may send a message to a device of occupant device system 105, and receiving unit 214 may receive a response from the same device.

Receiving unit 214 may interpret the response. Receiving unit 214 may include a natural language processing unit to facilitate communication. For example, receiving unit 214 may derive meaning from an audio message or from a written message.

Receiving unit 214 may analyze the response for significant content. For example, significant content may be a confirmation that an outlier corresponds to an actionable event (e.g., occupant 107 has fallen at home and needs medical attention, occupant 107 has been attacked at a public facility and needs security support, etc.). As another example, significant content may be a denial that an outlier corresponds to an actionable event. As yet another example, significant content may be an identification of a feature, activity, and/or event represented by a cluster. In some cases, receiving unit 214 may be unable to determine significant content, such as due to a lack of response or to an incoherent response. In such cases, receiving unit 214 may interpret the lack of significant content as confirmation that an outlier corresponds to an actionable event.

In some cases, based on the communication by sending unit 212 and receiving unit 214, communication unit 112 determines that an event is actionable. In such cases, sending unit 212 may generate a message for an emergency service, caregiver, emergency contact, building owner, service provider, or the like so as to alert them of the actionable event. The message may be in a variety of formats, such as an audio format, a written format, or a binary signal format like an alarm.

In other cases, communication unit 112 determines that the response, as interpreted by receiving unit 214, may be used as a label of encoded sensed data 220. In such cases, communication unit 112 may add the label to label data 218. As a result, training unit 114 may determine to retrain models 216 using label data 218.

Receiving unit 214 also receives encoded sensed data and predictions from edge device(s) 104.

Figure 3:
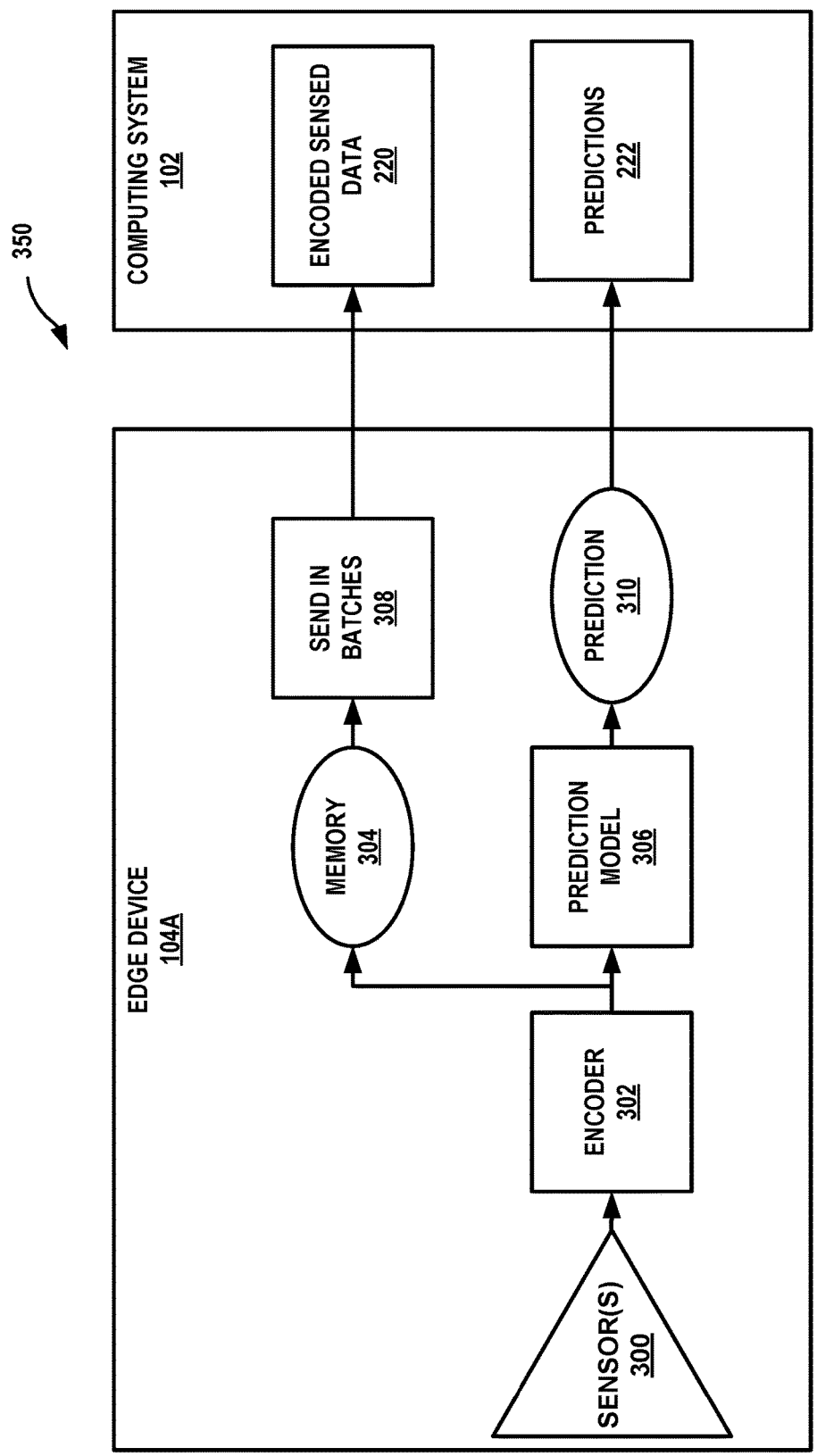
FIG. 3 is a block diagram illustrating an example prediction system in accordance with one or more aspects of this disclosure.

FIG. 3 is a block diagram illustrating an example prediction system in accordance with one or more aspects of this disclosure. Prediction system 350 includes edge device 104A, which may be a low power edge device and one of edge device(s) 104 of FIG. 1, and computing system 102. Edge device 104A may include one or more sensor(s) 300. Edge device 104A may include encoder 302, which may be an autoencoder of models 216 (FIG. 2). Encoder 302 may be a machine learned encoder which may be tailored to an individual (e.g., occupant 107) or a community associated with the environment in which edge device 104A is deployed. For example, encoder 302 may be tailored to sensed data associated with an elderly person living alone in their home where edge device 104A is deployed. Encoder 302 may encode the sensed data from sensor(s) 300. The encoded sensed data may be stored in one or more memory units (e.g., memory 304). Edge device 104A may transmit or send in batches (308) the encoded sensed data from memory 304 to computing system 102. By transmitting encoded sensed data in batches, edge device 104A may conserve power and enhance the security of the encoded sensed data as a bad actor attempting to capture the encoded sensed data would have less of an opportunity to capture the encoded sensed data than if the encoded sensed data were continuously transmitted by edge device 104A to computing system 102.

The encoded sensed data may also be input into prediction model 306, which may include a classifying algorithm. Prediction model 306 may be configured to predict normal behavior and abnormal behavior based on the encoded sensed data and may be one of models 216. Prediction model 306 may be a machine learned prediction model which may be trained based on previously encoded sensed data and may be tailored to an individual (e.g., occupant 107) or a community associated with the environment in which edge device 104A is deployed. For example, prediction model 306 may be trained on encoded sensed data associated with the elderly person living alone in their home where edge device 104A is deployed. By training the prediction model based on the encoded sensed data rather than unencoded sensed data, edge device 104A may maintain a higher level of security and use less power as the encoded sensed data is compressed when compared to the raw, unencoded data. Prediction model 306 may predict a behavior based on the encoded sensed data. In some examples, if prediction 310 is that the behavior is normal, edge device 104A may not transmit or send prediction 310 to computing system 102, thereby saving power. If prediction 310 is that the behavior is abnormal, e.g., the person is wandering back and forth between two rooms at 3 AM, edge device 104A may transmit or send prediction 310 to computing system 102 for action and/or further assessment.

Computing system 102 may receive the encoded sensed data sent in batches and store the encoded sensed data in encoded sensed data 220. In some examples, computing system 102 may also store prediction 310 in predictions 222. In other examples, computing system 102 may not include predictions 222 and may not store prediction 310.

Figure 4:
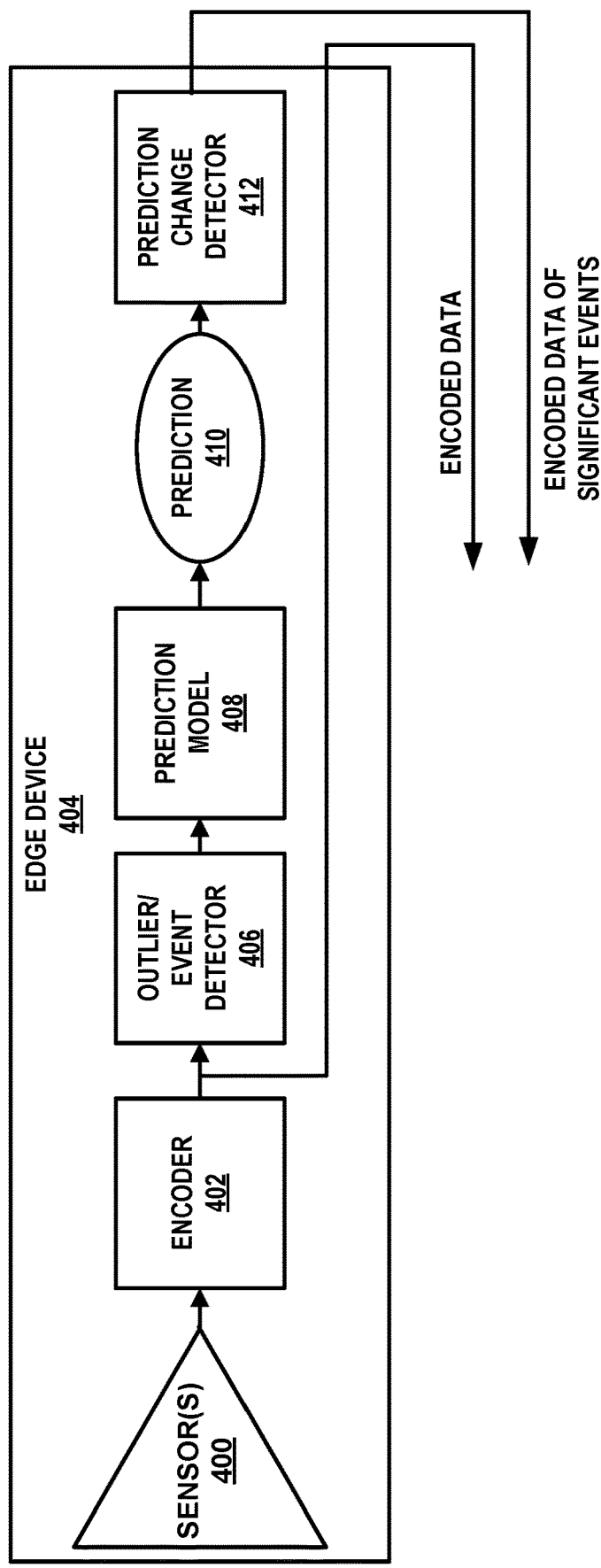
FIG. 4 is a block diagram of an example edge device in accordance with one or more aspects of this disclosure.

FIG. 4 is a block diagram of an example edge device in accordance with one or more aspects of this disclosure. Edge device 404 is shown. Edge device 404 may be an example of one of edge device(s) 104. Edge device 404 may be a low power edge device. Edge device 404 may include sensor(s) 400 which may sense data associated with an environment in which edge device 404 is deployed. In some examples, rather than including sensor(s) 400, edge device 404 may include communication circuitry (not shown) for receiving sensed data. Encoder 402, which may be a machine learned encoder, such as an autoencoder, may encode the sensed data.

Outlier/event detector 406 may distinguish routine behaviors from abnormal behaviors of occupant 107. When sensor(s) 400 senses new data, edge device 404 applies the new sensed data to encoder 402. Encoder 402 outputs a new code. In some examples, edge device 404 may store the new code in memory (not shown in FIG. 4). Outlier/event detector 406 may then apply the new code to prediction model 408, which may include a classifying algorithm, and determine a similarity of the new code to the clustered training codes.

Outlier/event detector 406 may determine a likelihood score based on a similarity measure, where the likelihood score reflects the probability that the new code represents the same feature, activity, and/or event as a cluster. In some cases, the measure may be a distance, such as the Euclidean distance, from the new code to the nearest code in a cluster, from the new code to the centroid of a cluster, or from the new code to each code in a cluster on average, where a lower distance correlates to a higher likelihood score. In other cases, the measure may be a density, such as the number of codes in a cluster within a certain radius of the new code, where a greater number of codes correlates to a higher likelihood score. Alternatively, or additionally, outlier/event detector 406 may use other measures to determine the likelihood of the new code belonging to a cluster. Outlier/event detector 406 may determine a threshold likelihood score, such that if a new code satisfies the threshold likelihood score, then the new code likely belongs in a cluster.

In some cases, the new code is similar to codes in a cluster. In such cases, outlier/event detector 406 may determine that the new code is not an outlier and may categorize the new code as a member of the cluster. For example, if the new code has a likelihood score that satisfies the threshold likelihood score with one cluster, outlier/event detector 406 may add the new code to the cluster. As another example, if the new code has two or more likelihood scores that satisfy the threshold likelihood score with two or more respective clusters, outlier/event detector 406 may add the new code to the cluster with the highest likelihood score. Additionally, or alternatively, outlier/event detector 406 may classify the new code according to prediction model 408. In other cases, the new code does not have a likelihood score that satisfies the threshold likelihood score with any cluster. In such cases, outlier/event detector 406 may determine that the new code is an outlier.

Prediction model 408 may analyze the event to determine prediction 410. Prediction model 408 may be an example of prediction model 306 of FIG. 3. Prediction change detector 412 may analyze the prediction 410 to determine whether the prediction is a change in the normal behavior of the person(s) in the environment in which edge device 404 is deployed. For example, prediction change detector 412 may compare prediction 410 to past predictions to determine whether the behavior is normal or is a change in normal behavior (e.g., abnormal behavior). Edge device 404 may transmit the encoded data and the encoded data (e.g., predictions, such as prediction 410) of significant events to computing system 102 (FIGS. 1-3). In some examples, edge device 404 transmits the encoded data in batches. In some examples, edge device 404 transmits predictions (e.g., prediction 410) that are determined to be abnormal or significant.

Figure 5:
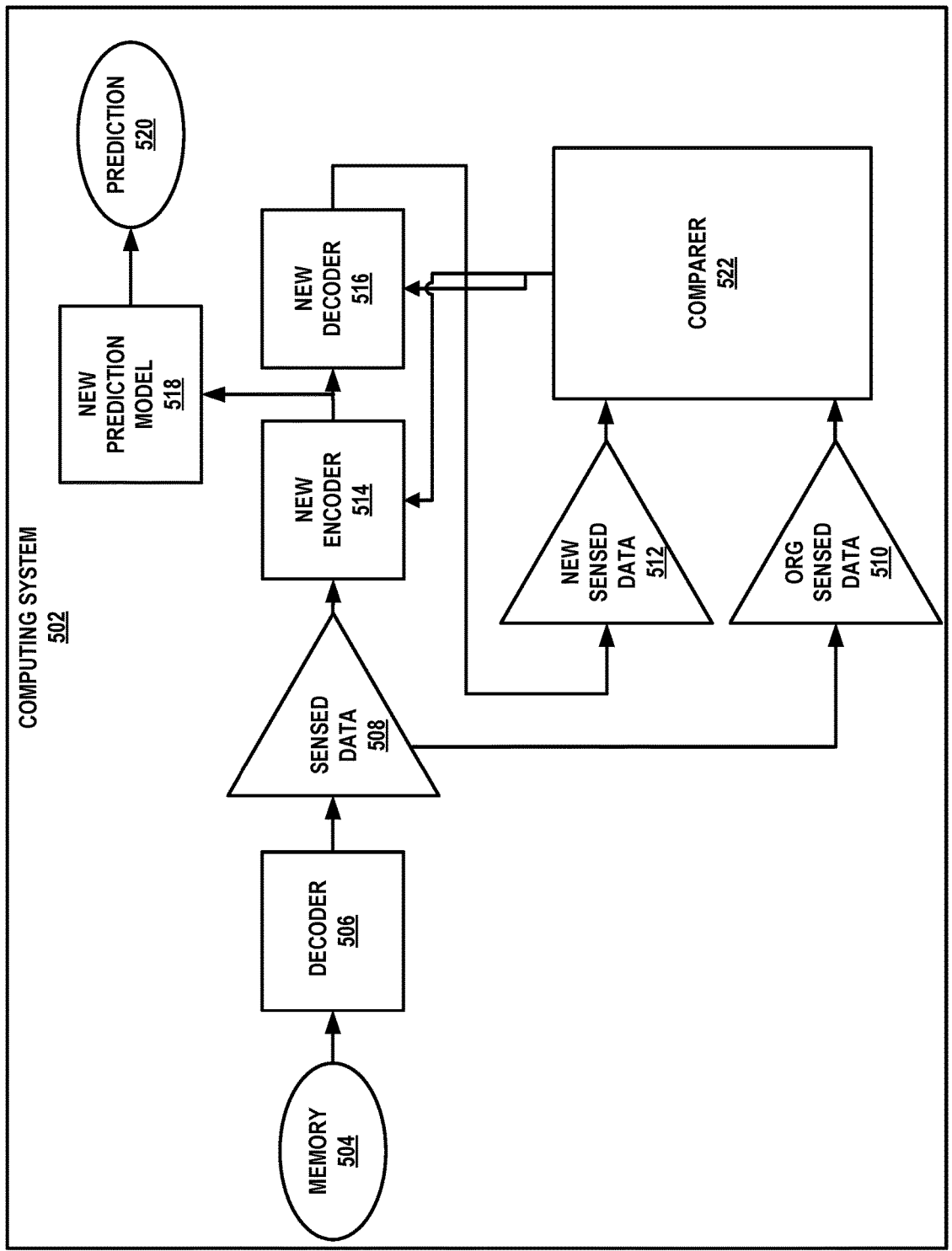
FIG. 5 is a block diagram of an example computing system in accordance with one or more aspects of this disclosure.

FIG. 5 is a block diagram of an example computing system in accordance with one or more aspects of this disclosure. Computing system 502 may be an example of computing system 102 (FIGS. 1-3). Computing system 502 may include one or more memory units (e.g., memory 504). Memory 504 may be an example of storage device(s) 206 (FIG. 2). Memory 504 may be configured to store encoded sensed data from edge device(s) 104 (FIG. 1). Memory 504 may also be configured to store decoder(s) corresponding to the encoder(s) of edge device(s) 104. Computing system 502 may load a decoder 506 which corresponds to the encoder used by the edge device to encode the sensed data. Decoder 506 may decode the encoded sensed data to generate sensed data 508. Sensed data 508 may be copied as original sensed data 510. Sensed data 508 may be encoded by new encoder 514. In some examples, new encoder 514 may begin as the encoder used to encode the sensed data by the edge device and be a retrained version of the encoder used to encode the sensed data. New encoder 514 may encode sensed data 508. Computing system 502 may train new prediction model 518, which may include a clustering algorithm and/or a classifying algorithm, using the newly encoded data from new encoder 514 so as to minimize class estimation error. The newly encoded data may be decoded by new decoder 516 which may be a corresponding decoder to new encoder 514. New decoder may generate new sensed data 512 which may be compared by comparer 522 to original sensed data 510 to determine a reconstruction error. New encoder 514 and new decoder 516 may be trained to minimize the reconstruction error.

Figure 6A:
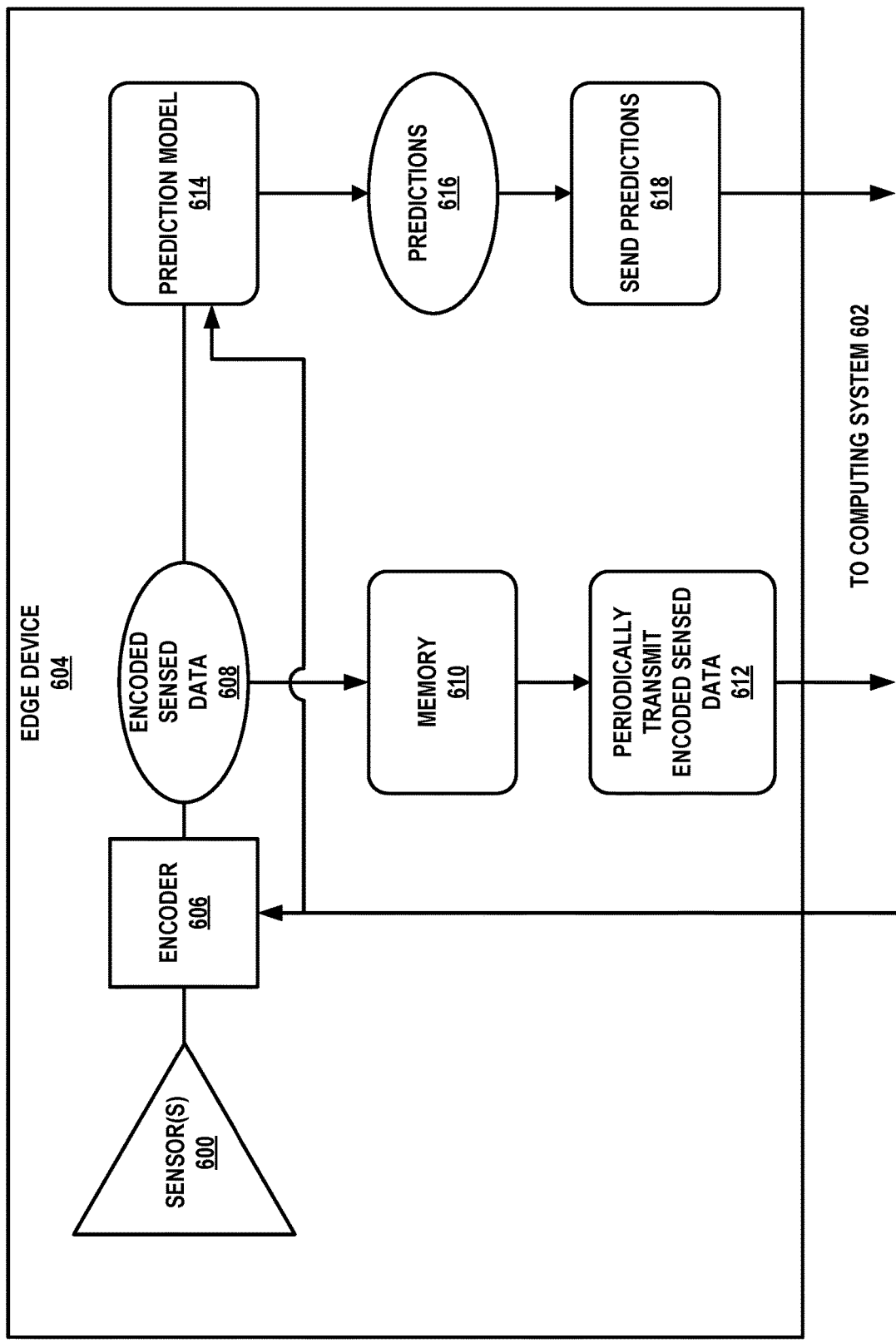
FIGS. 6A-6B are block diagrams illustrating an example system in accordance with one or more aspects of this disclosure.
Figure 6B:
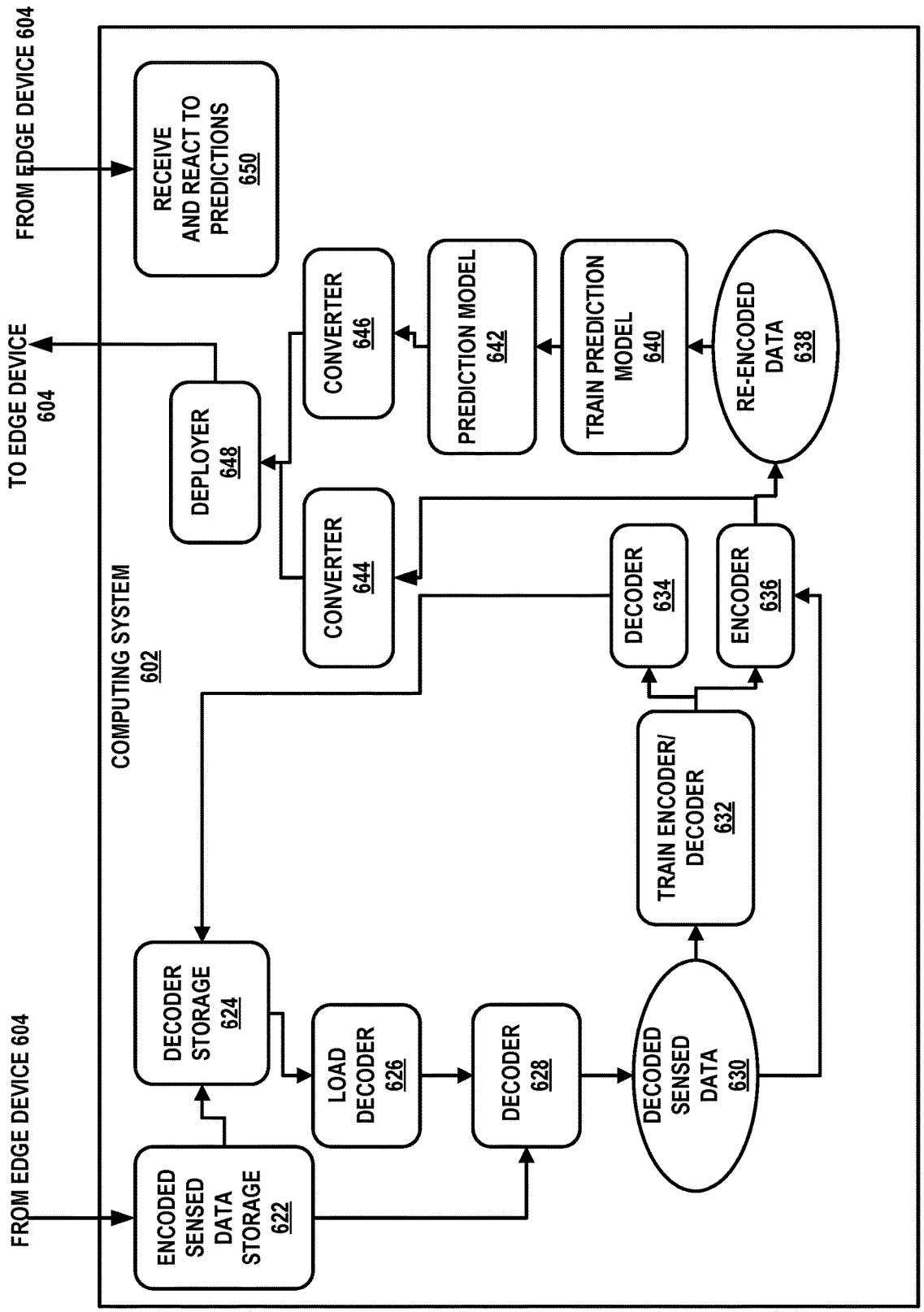

FIGS. 6A-6B are block diagrams illustrating an example system in accordance with one or more aspects of this disclosure. The example system of FIGS. 6A-6B includes edge device 604 and computing system 602. Edge device 604 may be an example of edge device(s) 104. Computing system 602 may be an example of computing system 102. Edge device 604 may include one or more sensor(s) 600. Sensor(s) 600 may be an example of sensor(s) 120 (FIG. 1). Encoder 606, which may be a machine learned autoencoder and one of models 216 (FIG. 2), may encode the sensed data to generate encoded sensed data 608. Edge device 604 may store encoded sensed data 608 in one or more memory units (e.g., memory 610). Memory 610 may be an example of memory 126 (FIG. 1). Edge device 604 may periodically transmit encoded sensed data 608 (612) from memory 610 to computing system 602. For example, edge device 604 may transmit encoded sensed data 608 in a batch. Prediction model 614, which may include a classifying algorithm, may generate predictions 616 based on the encoded sensed data. Prediction model 614 may be one of models 216. Edge device 604 may transmit predictions 616 to computing system 602. In some examples, edge device 604 may only transmit predictions 616 that edge device 604 determines are indicative of abnormal behavior. In some examples, edge device 604 may transmit predictions 616 substantially in real time. As such, edge device 604 may facilitate computing system 602 issuing an alert, an alarm, or notification to occupant 107, subscriber 108, an emergency service, caregiver, emergency contact, building owner, service provider, or the like, emergency response personnel, or other person, indicative of the abnormal behavior.

Computing system 602 may receive the encoded sensed data 608 from edge device 604. Computing system 602 may store the encoded sensed data in encoded sensed data storage 622. Encoded sensed data storage may be an example of storage device(s) 206 (FIG. 2). Periodically, when it is desirable to update the models based on recently collected sensed data, or upon receipt of an external command, computing system 602 may train a new encoder and corresponding new decoder (632). For example, computing system 602 may determine, based on metadata associated with the encoded sensed data or otherwise, which decoder corresponds to the encoder used to encode the encodes sensed data. Computing system 602 may load (626) the corresponding decoder 628 from decoder storage 624. Decoder storage 624 may be an example of models 216 (FIG. 2). Decoder 628 may decode the encoded sensed data from encoded sensed data storage to generate decoded sensed data 630. Computing system 602 may use the decoded sensed data 630 to train (632) a new encoder 636 and corresponding new decoder 634). In some examples, computing system 602 may begin with decoder 628 and a corresponding encoder when training decoder 634 and encoder 636. Once decoder 634 and encoder 636 have been trained, computing system 602 may store decoder 634 in decoder storage 624. Computing system 602 may tag decoder 634 with information, such as metadata, indictive of which encoder (e.g., encoder 636) decoder 634 corresponds.

Encoder 636 may re-encode decoded sensed data 630 to generate re-encoded data 638. Computing system 602 may use re-encoded data 638 to train a prediction model (640) to generate prediction model 642. Prediction model 642 may include a clustering algorithm and a classifying algorithm. In some examples, computing system 602 may begin the training with an existing prediction model, such as prediction model 614 of edge device 604. In some examples, converter 644 may convert encoder 636 for use with a microcontroller or a field-programmable gate array (FPGA) which may be present in edge device 604. In some examples, converter 646 may convert at least a portion of prediction model 642, such as the classifying algorithm, for use with a microcontroller or an FPGA which may be present in edge device 604. While shown as two separate converters, converter 644 and converter 646 may in some examples be a single converter. For example, converter 644 and/or converter 646 may use TensorFlow Lite to convert encoder 636 and/or prediction model 642 for use by a microcontroller. For example, converter 644 and/or converter 646 may use Binarized Neural Networks to convert encoder 636 and/or prediction model 642 for use by an FPGA. Deployer 648, which may be an example of sending unit 212 (FIG. 2) may transmit encoder 636, at least a portion of prediction model 642, a converted version of encoder 636 or a converted version of at least a portion of prediction model 642 for deployment within edge device 604. For example, edge device 604 may replace (e.g., overwrite) encoder 606 with encoder 636 or a converted version thereof. Edge device 604 may replace (e.g., overwrite) prediction model 614 with at least a portion of prediction model 642, such as the classification algorithm, or a converted version thereof. Computing system 602 may receive predictions 616 from edge device 604 and react to predictions 616 (650). For example, computing system 602 may generate an alert, alarm, or other notification for output to a computing device, such as a cellular phone, a server, a landline telephone, etc., to notify someone of the abnormal behavior of the user. In some examples, computing system 602 may issue a visual (e.g., flashing light), audible (e.g., loud alarm sound), or haptic alert.

Figure 7:
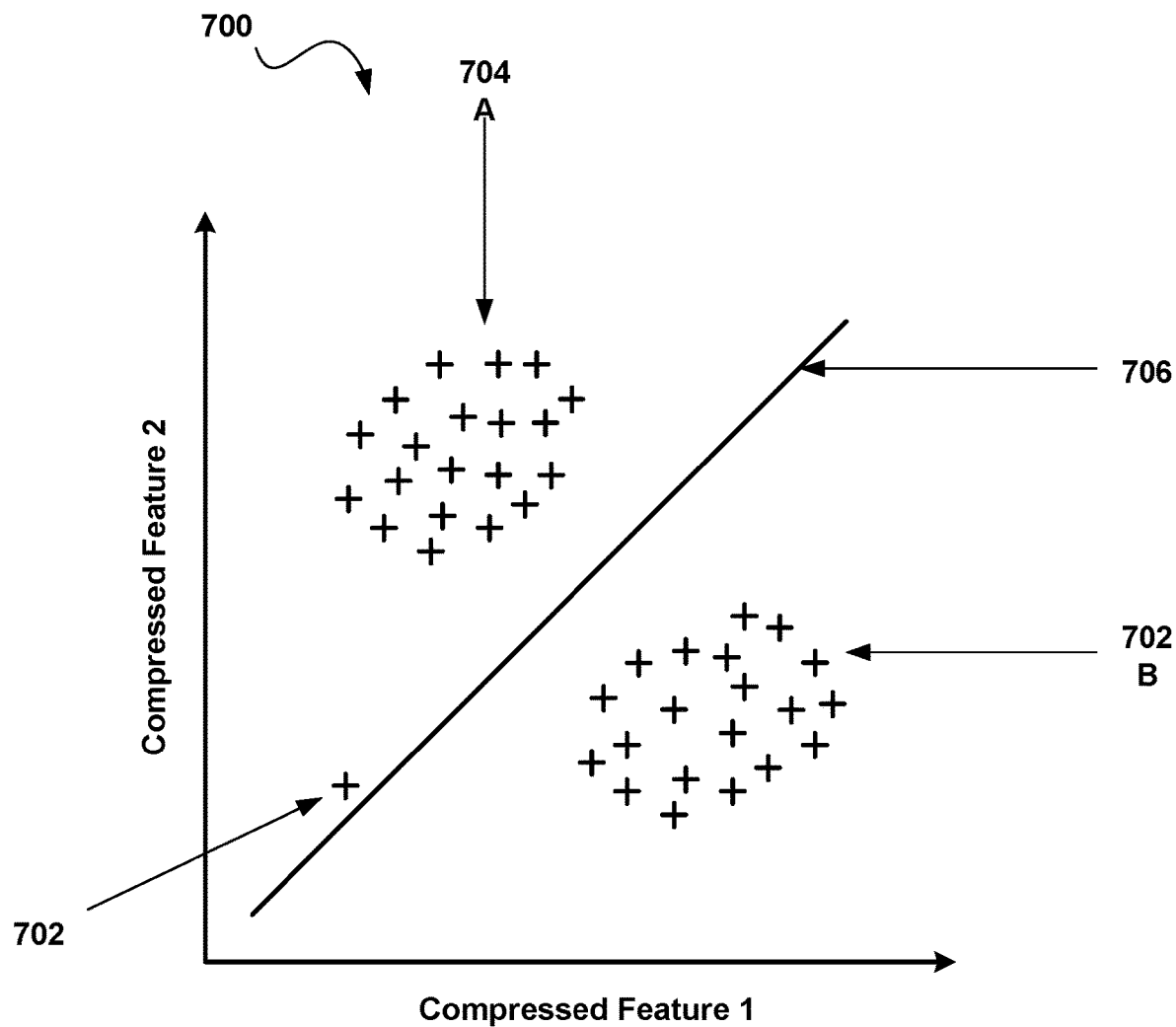
FIG. 7 is a conceptual diagram illustrating an example plot 700 of code clusters and an anomalous code.

FIG. 7 is a conceptual diagram illustrating an example plot 700 of code clusters and an anomalous code. Plot 700 includes codes from an encoder mapped according to relative values of two compressed features. The prediction model, which may include a clustering algorithm and a classification algorithm, of models 216 has determined that codes in cluster 704A are distinct from codes in cluster 704B, and the prediction model of models 216 categorizes the codes into respective classes based on classifier discriminant 706. New code 702 either belongs to cluster 704A, belongs to cluster 704B, or is an anomalous code. An anomalous code may be representative of a behavior of occupant 107 being abnormal.

During training, the prediction model determines naturally occurring groups (e.g., clusters) of codes. For example, the prediction model may determine that the set of codes corresponding to cluster 704A and the set of codes corresponding to cluster 704B are distinct clusters.

In some examples, computing system 102 trains the prediction model using feedback from occupant device system 105 as labels for codes. For example, computing system 102 may label the codes corresponding to cluster 704A as "watching TV" and the codes corresponding to cluster 704B as "vacuuming." During training, the prediction model may distinguish a "watching TV" class from a "vacuuming" class with classifier discriminant 706. In other examples, computing system does not train the prediction model using feedback from occupant device system 105 as labels for codes. In other examples, computing system 102 trains the prediction model to predict the arbitrary cluster labels created by the clustering algorithm. Those labels, when later re-produced by the trained prediction model can be used to query the occupant for the appropriate activity label. For example, the occupant would be queried for the activity corresponding to "cluster 1" with reference to the time of activity and the occupant may label the activity as "watching TV"

In the event of obtaining new code 702, computing system 102 determines whether new code 702 is anomalous by comparing new code 702 to the codes composing clusters 704A-B using a similarity measure. In some cases, although the prediction model may classify new code 702 into the class corresponding to cluster 704A, the prediction model may determine from the dissimilarity of new code 702 to the codes composing clusters 704A-B that new code 702 is anomalous. For example, the similarity of new code 702 to the codes composing clusters 704A-B may not meet a threshold similarity to constitute belonging to clusters 704A-B. In such cases, edge device(s) 104 may transmit a prediction indicative of abnormal behavior to computing system 102 and computing system 102 may perform an alert action.

In other cases, the prediction model may determine that new code 702 is sufficiently similar to clusters 704A-B as not to be anomalous. For example, the comparison of the similarity of new code 702 to the codes composing clusters 704A-B may meet a threshold similarity. In such cases, in some examples, edge device(s) 104 may not transmit the prediction, as the prediction is that the behavior is normal.

Figure 8:
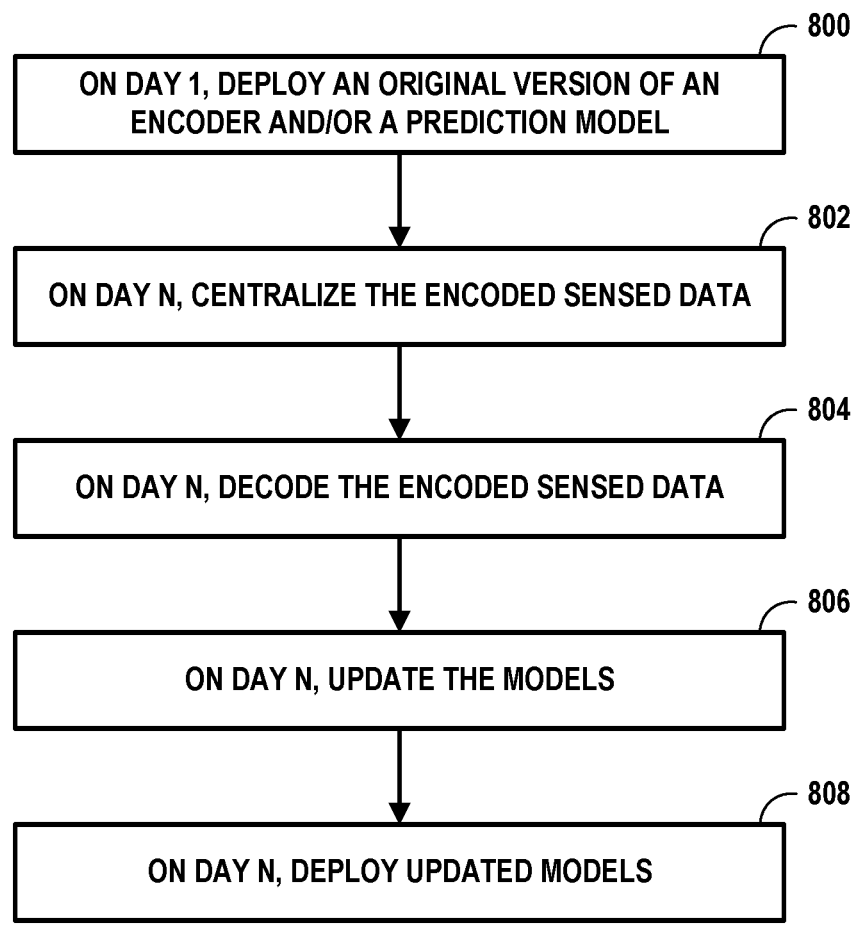
FIG. 8 is a flow diagram illustrating an example period for deploying models from the computing system to the edge device(s) in accordance with one or more aspects of this disclosure.

FIG. 8 is a flow diagram illustrating an example period for deploying models from the computing system to the edge device(s) in accordance with one or more aspects of this disclosure. While discussed with respect to FIGS. 6A-6B, the techniques of FIG. 8 may be performed by any of the computing systems and/or edge devices discussed herein. Computing system 602 may, on day 1, deploy an original version of an encoder (e.g., encoder 606) and/or prediction model (e.g., prediction model 614) to edge device 604 (800). Day 1 may be the day that edge device 604 is deployed in the intended environment, such as an elderly person's home. In some examples, the original encoder is based on one or more other encoders already deployed in the environment on other edge devices. In some examples, the original encoder is based on an aggregate of other edge devices' encoder and decoder weights, such as with a federated learning model. In some examples, the original prediction model is based on one or more other prediction models already deployed in the environment on other edge devices. In some examples, the original prediction model is based on an aggregate of other prediction models, such as with a federated learning model.

On day N, the edge devices 604 and the computing system may centralize the encoded sensed data (802). For example, each deployed edge device 604 may transmit their encoded sensed data to computing system 602 which computing system 602 may receive and/or store. On day N (or a later day), computing system 602 may decode the encoded sensed data (804). For example, computing system 602 may load each decoder corresponding to each encoder used to encode the encoded sensed data and use such decoders to decode the encoded sensed data. Computing system 602 on day N may update the models (806). For example, computing system 602 may update the encoder and/or the prediction model used by each of the edge devices deployed in the environment. In some examples, these updated encoders and prediction models may be tailored for each respective edge device 604, so that each encoder or prediction model may be different than an encoder or prediction model of another edge device 604. Computing system 602, on day N (or a later day), may deploy the updated models to the edge devices 604 (808). For example, computing system 602 may deploy each of the updated encoders and/or prediction models to each of the edge devices within the environment.

Figure 9:
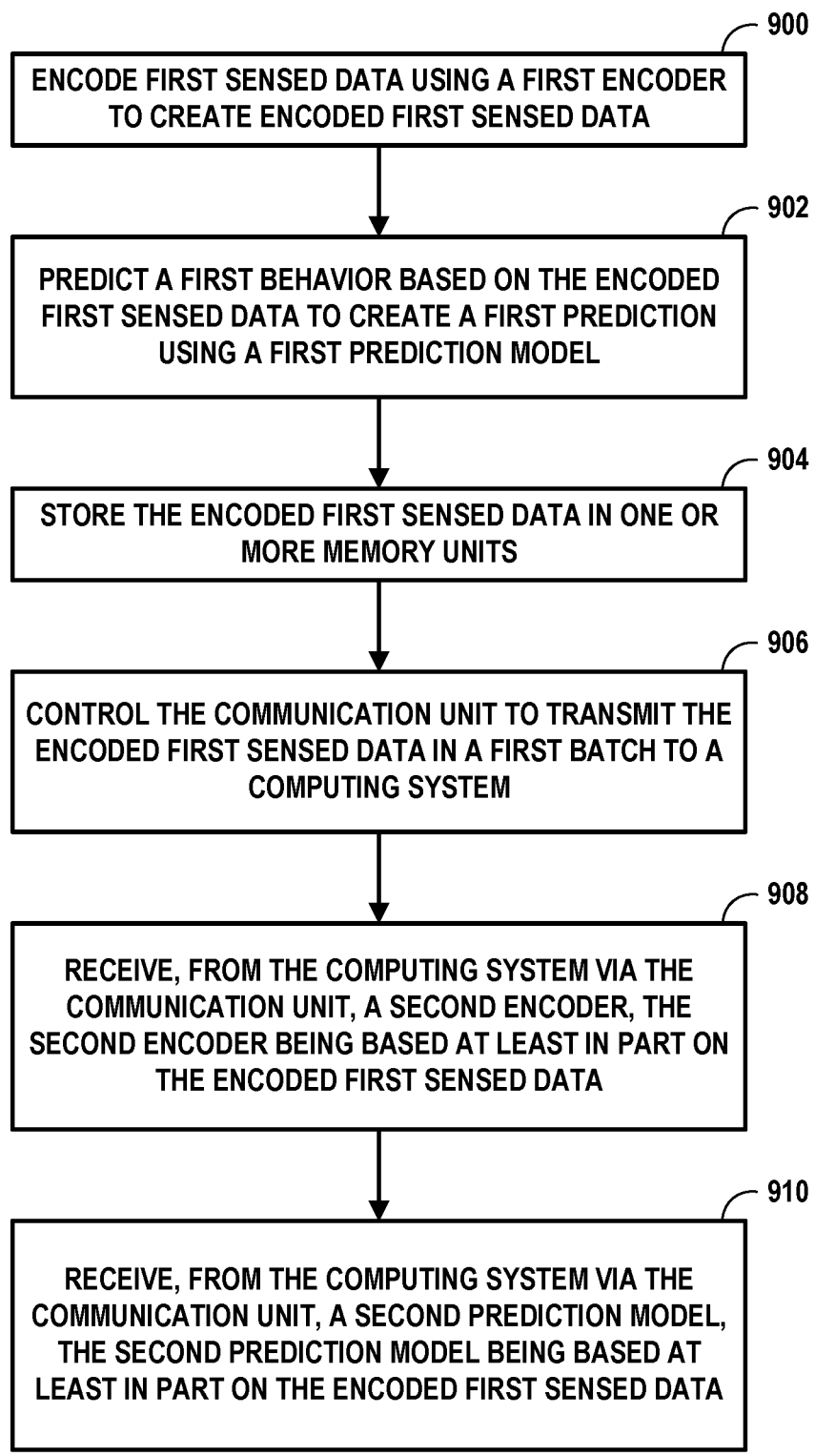
FIG. 9 is a flow diagram of example prediction techniques in accordance with one or more aspects of this disclosure.

FIG. 9 is a flow diagram of example prediction techniques in accordance with one or more aspects of this disclosure. While discussed with respect to FIGS. 6A-6B, the techniques of FIG. 9 may be performed by any of the computing systems and/or edge devices discussed herein. Edge device 604 may encode first sensed data using a first encoder to create encoded first sensed data (900). For example, edge device 604 may encode sensed data from sensor(s) 600 using encoder 606. Edge device 604 may predict a first behavior based on the encoded first sensed data to create a first prediction using a first prediction model (902). For example, edge device 604 may predict one of predictions 616 using prediction model 614, which may include a classification algorithm. Edge device 604 may store the encoded first sensed data in the one or more memory units (904). For example, edge device 604 may store encoded sensed data 608 in memory 610. Edge device 604 may control the communication unit to transmit the encoded first sensed data in a first batch to a computing system (906). For example, edge device 604 may periodically transmit the encoded sensed data (612) to computing system 602. Edge device 604 may receive, from computing system 602 via the communication unit, a second encoder, the second encoder being based at least in part on the encoded first sensed data (908). For example, edge device 604 may receive, from computing system 602, encoder 636 or a converted version of encoder 636. Edge device 604 may receive, from computing system 602 via the communication unit, a second prediction model, the second prediction model being based at least in part on the encoded first sensed data (910). For example, edge device 604 may receive, from computing system 602, at least a portion of prediction model 642 or a converted version of at least a portion of prediction model 642. For example, edge device 604 may receive an updated classifier algorithm of prediction model 642.

In some examples, edge device 604 may determine that the first prediction is representative of a behavior of a user being abnormal or of a particular category of interest (such as is the user getting out of bed, getting dressed, cooking, bathing, or the like), and in response to the determination that the first prediction is representative of the behavior of the user being abnormal or of a particular category of interest, control the communication unit to transmit the first prediction to computing system 602. In some examples, the second encoder is based at least in part on the encoded first sensed data comprises the second encoder is based at least in part on a decoded version of the encoded first sensed data. In some examples, the second encoder is further based on the first encoder and the second prediction model is further based on one or more labels. For example, the one or more labels may be labels derived or determined from clustering and/or occupant feedback.

In some examples, edge device 604 is configured to encode second sensed data using the second encoder to create encoded second sensed data. In some examples, edge device 604 is configured to predict a second behavior based on the encoded second sensed data to create a second prediction using the second prediction model. In some examples, edge device 604 is configured to store the encoded second sensed data in the one or more memory units (e.g., memory 610). In some examples, edge device 604 is configured to control the communication unit to transmit the encoded second sensed data in a second batch to computing system 602. In some examples, edge device 604 may be configured to receive, from computing system 602 via the communication unit, a third encoder, the third encoder being based at least in part on the encoded second sensed data. In some examples, edge device 604 may be configured to receive, from computing system 602 via the communication unit, a third prediction model, the third prediction model being based at least in part on the encoded second sensed data.

In some examples, the first encoder is an encoder of a first autoencoder and the second encoder is an encoder of a second autoencoder. In some examples, the first encoder is based on a plurality of encoders each being associated with a respective location or individual. In some examples, the first encoder is based on a plurality of encoders associated with a plurality of locations or a plurality of individuals.

Figure 10:
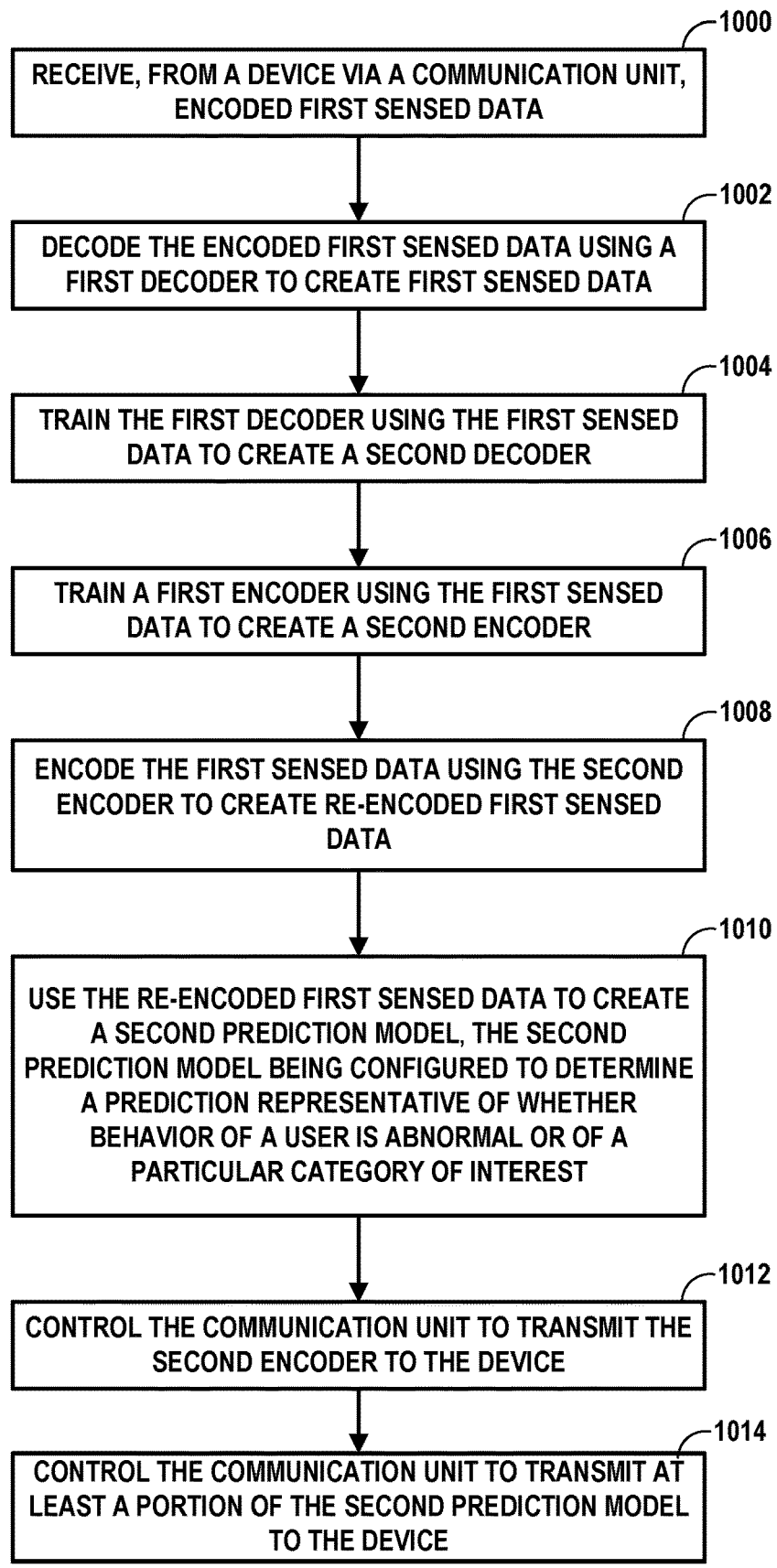
FIG. 10 is a flow diagram illustrating example training techniques for encoders, decoders, and prediction models in accordance with one or more aspects of this disclosure.

FIG. 10 is a flow diagram illustrating example training techniques for encoders, decoders, and prediction models in accordance with one or more aspects of this disclosure. While discussed with respect to FIGS. 6A-6B, the techniques of FIG. 10 may be performed by any of the computing systems and/or edge devices discussed herein. Computing system 602 may receive, from edge device 604 via a communication unit, encoded first sensed data (1000). For example, edge device 604 may transmit a first batch of encoded sensed data to computing system 602 which may receive the first batch of encoded sensed data.

Computing system 602 may decode the encoded first sensed data using a first decoder to create first sensed data (1002). For example, computing system 602 may determine that the encoded first sensed data was encoded using the first encoder (e.g., encoder 606) and load the first decoder (e.g., corresponding decoder 628) from the one or more memory units (e.g., decoder storage 624) in response to the determination. For example, computing system 602 may decode the encoded first sensed data using decoder 628. Computing system 602 may train the first decoder using the first sensed data to create a second decoder (1004). For example, computing system 602 may train decoder 628 to create decoder 634. Computing system 602 may train a first encoder using the first sensed data to create a second encoder (1006). For example, computing system 602 may train encoder 606 using the first sensed data to create encoder 636. Computing system 602 may encode the first sensed data using the second encoder to create re-encoded first sensed data (1008). For example, computing system 602 may encode decoded sensed data 630 using encoder 636 to generate re-encoded data 638.

Computing system 602 may use the re-encoded first sensed data to create a second prediction model, which may include a clustering algorithm and/or a classifying algorithm, the first prediction model being configured to determine a prediction representative of whether behavior of a user is abnormal or of a particular category of interest (e.g., getting out of bed, getting dressed, cooking, bathing, etc.) (1010). For example, computing system 602 may train prediction model 614 using re-encoded data 638 to create prediction model 642. Computing system 602 may control the communication unit to transmit the second encoder to edge device 604 (1012). For example, computing system 602 may control the communication unit to transmit encoder 636 to edge device 604. In some examples, computing system 602 may convert encoder 636 to run on a microcontroller or an FPGA prior to transmitting encoder 636. Computing system 602 may control the communication unit to transmit at least a portion of the second prediction model to the edge device (1014). For example, computing system 602 may control the communication unit to transmit the classifying algorithm of prediction model 642 to edge device 604. In some examples, computing system 602 may convert the classifying algorithm of prediction model 642 to run on a microcontroller or an FPGA prior to transmitting the classifying algorithm of prediction model 642.

In some examples, computing system 602 store second decoder in the one or more memory units. In some examples, computing system 602 may receive from edge device 604 via the communication unit encoded second sensed data. In some examples, computing system 602 may decode the encoded second sensed data using the second decoder to create second sensed data. In some examples, computing system 602 may train the second decoder using the second sensed data to create a third decoder. In some examples, computing system 602 may train the second encoder using the second sensed data to create a third encoder. In some examples, computing system 602 may encode the second sensed data using the third encoder to create re-encoded second sensed data. In some examples, computing system 602 may use the re-encoded second sensed data to create a third prediction model. In some examples, computing system 602 may control the communication unit to transmit the third encoder to edge device 604. In some examples, computing system 602 may control the communication unit to transmit at least a portion of the third prediction model to edge device 604.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, microcontrollers, FPGAs, or other equivalent integrated or discrete logic circuitry, as well as any combination of such components. Accordingly, the term "processor," as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
   a communication unit configured to transmit data to and receive data from a computing system;
   one or more processors; and
   one or more memories storing processor-executable instructions that, when executed by the one or more processors, cause the one or more processors to perform operations comprising:
      encoding first sensed data using a first encoder to create encoded first sensed data;
      predicting a first behavior of a user based on the encoded first sensed data to create a first prediction using a first prediction model;
      storing the encoded first sensed data in the one or more memories;
      determining that the first prediction is representative of the first behavior of the user being of a particular category of interest or outside of one or more categories of expected behavior;
      in response to the determining, controlling the communication unit to transmit the first prediction over a network to the computing system;
      controlling the communication unit to transmit the encoded first sensed data in a first batch over the network to the computing system;
      receiving, from the computing system over the network via the communication unit and in response to transmitting the encoded first sensed data to the computing system, a second encoder, the second encoder being based at least in part on the encoded first sensed data;
      receiving, from the computing system over the network via the communication unit, a second prediction model, the second prediction model being based at least in part on the encoded first sensed data;

encoding second sensed data using the second encoder to create encoded second sensed data; and predicting a second behavior based on the encoded second sensed data to create a second prediction using the second prediction model.

2. The device of claim 1, wherein the second encoder is based at least in part on a decoded version of the encoded first sensed data.

3. The device of claim 1, wherein the second encoder is further based on the first encoder and wherein the second prediction model is further based on one or more labels.

4. The device of claim 1, wherein the operations further comprise:

storing the encoded second sensed data in the one or more memories;

controlling the communication unit to transmit the encoded second sensed data in a second batch over the network to the computing system;

receiving, from the computing system over the network via the communication unit, a third encoder, the third encoder being based at least in part on the encoded second sensed data; and receiving, from the computing system over the network via the communication unit, a third prediction model, the third prediction model being based at least in part on the encoded second sensed data.

5. The device of claim 1, wherein the first encoder is an encoder of a first autoencoder and the second encoder is an encoder of a second autoencoder.

6. A computing system comprising:

a communication unit configured to transmit data to and receive data from a device having a first prediction model;

one or more processors; and one or more memories storing processor-executable instructions that, when executed by the one or more processors, cause the one or more processors to perform operations comprising:

receiving, from the device over a network via the communication unit, encoded first sensed data;

decoding the encoded first sensed data using a first decoder to create first sensed data;

training the first decoder using the first sensed data to create a second decoder;

training a first encoder using the first sensed data to create a second encoder;

encoding the first sensed data using the second encoder to create re-encoded first sensed data;

using the re-encoded first sensed data to create a second prediction model, the second prediction model being configured to determine a prediction representative of whether a first behavior of a user is of a particular category of interest or outside of one or more categories of expected behavior;

controlling the communication unit to transmit the second encoder over the network to the device; and controlling the communication unit to transmit at least a portion of the second prediction model over the network to the device.

7. The computing system of claim 6, wherein the operations further comprise:

determining that the encoded first sensed data was encoded using the first encoder; and loading the first decoder from the one or more memories in response to determining that the encoded first sensed data was encoded using the first encoder.

8. The computing system of claim 7, wherein the operations further comprise:

storing the second decoder in the one or more memories.

9. The computing system of claim 6, wherein the operations further comprise:

receiving, from the device over the network via the communication unit, encoded second sensed data;

decoding the encoded second sensed data using the second decoder to create second sensed data;

training the second decoder using the second sensed data to create a third decoder;

training the second encoder using the second sensed data to create a third encoder;

encoding the second sensed data using the third encoder to create re-encoded second sensed data;

using the re-encoded second sensed data to create a third prediction model;

controlling the communication unit to transmit the third encoder over the network to the device; and controlling the communication unit to transmit at least a portion of the third prediction model over the network to the device.

10. A computer-implemented method comprising:

encoding, by one or more processors of a device, first sensed data using a first encoder to create encoded first sensed data;

predicting, by the one or more processors, a first behavior of a user based on the encoded first sensed data to create a first prediction using a first prediction model;

storing, by the one or more processors, the encoded first sensed data in one or more memories;

determining, by the one or more processors, that the first prediction is representative of the first behavior of the user being of a particular category of interest or outside of one or more categories of expected behavior;

in response to the determining, controlling, by the one or more processors, the communication unit to transmit the first prediction over a network to a computing system;

controlling, by the one or more processors, a communication unit to transmit the encoded first sensed data in a first batch over the network to the computing system;

receiving, by the one or more processors and from the computing system over the network via the communication unit and in response to transmitting the encoded first sensed data to the computing system, a second encoder, the second encoder being based at least in part on the encoded first sensed data;

receiving, by the one or more processors and from the computing system over the network via the communication unit, a second prediction model, the second prediction model being based at least in part on the encoded first sensed data;

encoding, by the one or more processors, second sensed data using the second encoder to create encoded second sensed data; and predicting, by the one or more processors, a second behavior based on the encoded second sensed data to create a second prediction using the second prediction model.

11. The computer-implemented method of claim 10, wherein the second encoder is based at least in part on a decoded version of the encoded first sensed data.

12. The computer-implemented method of claim 10, wherein the second encoder is further based on the first encoder and wherein the second prediction model is further based on one or more labels.

13. The computer-implemented method of claim 10, further comprising:
- storing, by the one or more processors, the encoded second sensed data in the one or more memories;
- controlling, by the one or more processors, the communication unit to transmit the encoded second sensed data in a second batch over the network to the computing system;
- receiving, by the one or more processors and from the computing system over the network via the communication unit, a third encoder, the third encoder being based at least in part on the encoded second sensed data; and
- receiving, by the one or more processors and from the computing system over the network via the communication unit, a third prediction model, the third prediction model being based at least in part on the encoded second sensed data.

14. The computer-implemented method of claim 10, wherein the first encoder is an encoder of a first autoencoder and the second encoder is an encoder of a second autoencoder.

15. A computer-implemented method comprising:
- receiving, by one or more processors and from a device over a network via a communication unit, encoded first sensed data, the device having a first prediction model;
- decoding, by the one or more processors, the encoded first sensed data using a first decoder to create first sensed data;
- training, by the one or more processors, the first decoder using the first sensed data to create a second decoder;
- training, by the one or more processors, a first encoder using the first sensed data to create a second encoder;
- encoding, by the one or more processors, the first sensed data using the second encoder to create re-encoded first sensed data;
- using, by the one or more processors, the re-encoded first sensed data to create a second prediction model, the second prediction model being configured to determine a prediction representative of whether a first behavior of a user is of a particular category of interest or outside of one or more categories of expected behavior;
- controlling, by the one or more processors, the communication unit to transmit the second encoder over the network to the device; and
- controlling, by the one or more processors, the communication unit to transmit at least a portion of the second prediction model over the network to the device.

16. The computer-implemented method of claim 15, further comprising:
- determining that the encoded first sensed data was encoded using the first encoder; and
- loading the first decoder from one or more memories in response to determining that the encoded first sensed data was encoded using the first encoder.

17. The computer-implemented method of claim 15, further comprising:
- storing the second decoder in one or more memories.

18. The computer-implemented method of claim 15, further comprising:
- receiving, by the one or more processors and from the device over the network via the communication unit, encoded second sensed data;
- decoding, by the one or more processors, the encoded second sensed data using the second decoder to create second sensed data;
- training, by the one or more processors, the second decoder using the second sensed data to create a third decoder;
- training, by the one or more processors, the second encoder using the second sensed data to create a third encoder;
- encoding, by the one or more processors, the second sensed data using the third encoder to create re-encoded second sensed data;
- using, by the one or more processors, the re-encoded second sensed data to create a third prediction model;
- controlling, by the one or more processors, the communication unit to transmit the third encoder over the network to the device; and
- controlling, by the one or more processors, the communication unit to transmit at least a portion of the third prediction model over the network to the device.

* * * * *